United States Patent [19]

Lovell et al.

[11] Patent Number: 4,952,051
[45] Date of Patent: Aug. 28, 1990

[54] METHOD AND APPARATUS FOR PRODUCING ANIMATED DRAWINGS AND IN-BETWEEN DRAWINGS

[76] Inventors: Douglas C. Lovell; Rose M. Lorincz-Lovell, both of 40 Liss Rd., Wappinger's Falls, N.Y. 12590-1609

[21] Appl. No.: 249,834

[22] Filed: Sep. 27, 1988

[51] Int. Cl.$^5$ .............................................. G03B 21/32
[52] U.S. Cl. ........................................ 352/87; 352/50; 352/51; 352/52; 352/129; 340/725
[58] Field of Search ....................... 352/87, 50, 51, 52, 352/129; 340/725

[56] References Cited

U.S. PATENT DOCUMENTS

| | | |
|---|---|---|
| Re. 17,330 | 6/1929 | Williams . |
| 1,107,193 | 8/1914 | Bray . |
| 1,143,542 | 6/1915 | Hurd . |
| 1,179,068 | 4/1916 | Bray . |
| 1,198,598 | 9/1916 | Sudmann . |
| 1,235,871 | 8/1917 | Aument . |
| 1,260,393 | 3/1918 | Keen . |
| 1,261,648 | 4/1918 | Terry . |
| 1,375,918 | 4/1921 | Lederer . |
| 1,422,527 | 7/1922 | Berger . |
| 1,633,547 | 6/1927 | Hurd . |
| 1,715,127 | 5/1929 | Goldman . |
| 1,715,230 | 5/1929 | Gelmartin . |
| 1,805,511 | 5/1931 | Carpenter . |
| 1,815,251 | 7/1931 | Goldman . |
| 1,919,735 | 7/1933 | Lane . |
| 2,091,144 | 8/1937 | Freil . |
| 2,130,541 | 9/1938 | Fleischer . |
| 2,153,902 | 4/1939 | Tondreau . |
| 2,351,634 | 6/1944 | Place . |
| 2,450,017 | 9/1948 | Place . |
| 2,958,257 | 11/1960 | Traeger . |
| 3,168,742 | 2/1965 | Chambers . |
| 3,228,742 | 1/1966 | Hand . |
| 3,350,158 | 10/1967 | Blattner . |
| 3,390,939 | 7/1968 | Paracuellgs . |
| 3,441,343 | 4/1969 | Piron et al. . |
| 3,506,343 | 4/1970 | Dejoux . |
| 3,556,646 | 1/1971 | Guidi et al. . |
| 3,731,995 | 5/1973 | Reiffel ................................... 352/87 |
| 3,747,087 | 7/1973 | Harrison, III et al. . |
| 3,809,463 | 5/1974 | Winchell . |
| 3,888,572 | 6/1975 | Dejoux . |
| 3,905,692 | 9/1975 | Hart . |
| 4,346,403 | 8/1982 | Tamura . |

OTHER PUBLICATIONS

Geoffrey Gardner, "Simulation of Scenes Using Textured Qundratic Surfaces" Computer Graphics, ACM SIGGRAPH, NY, vol. 18, No. 3, pp. 11-20, 1984.
Donald P. Greenberg, "Coons Award Lecture", Communications of the ACM, NY, pp. 123-129, p. 151, Feb. 1988.
"Traditional Animators Talk About Computer Animation at SIGGRAPH Panel" IEEE Computer Graphics and Algorithms, pp. 66-67, Sep. 1987.
John Lasseter, "Principles of Traditional Animation Applied to 3-D Computer Animation" Computer Graphics, ACM SIGGRAPH, NY, vol. 21, No. 4, pp. 35-44, 1987.
Jeff Evans, "The Illusion of Life: Traditional Character Animation on the Amiga" Amiga World, Peterborough, NH, pp. 13-18, Sep./Oct. 1986.
Abigail Reifsnyder, "Deluxe Paint" Amiga World, Peterborough, NH, pp. 72-74, Mar./Apr. 1986.

*Primary Examiner*—Monroe H. Hayes

[57] ABSTRACT

A method and system which enables an animator to make drawings and in-between drawings. Preceding and following tweens 74 and 75 are shown to the animator in such a way that they are distinguishable from each other and from the in-between drawing 73 on which the animator is working. Advantage is made of electronic graphics and display technology to assist the animator with drawing, editing, and coloring. The drawings are kept in an ordered list in which they can be arbitrarily inserted or deleted, drawn, and edited. The drawings can be viewed in animation immediately upon demand, yielding an instant pencil test for the animator. The drawings can also be output to a recording device according to the list.

10 Claims, 14 Drawing Sheets

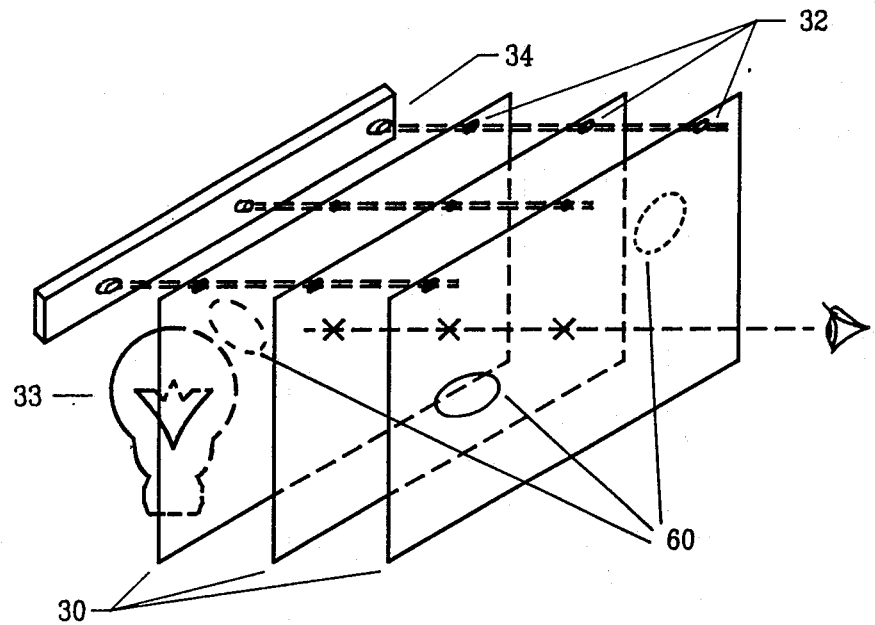
Figure 3: Prior Art
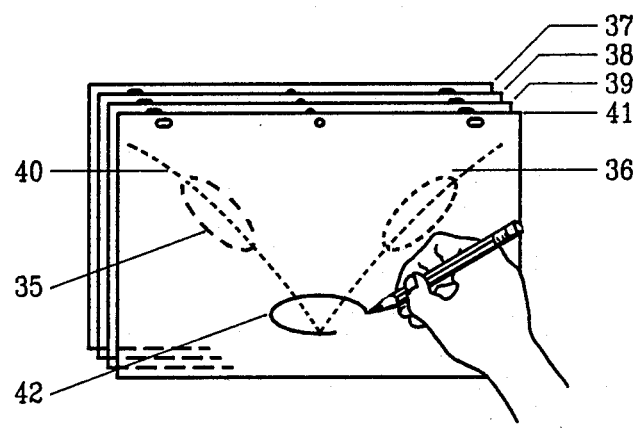
Figure 4: Prior Art

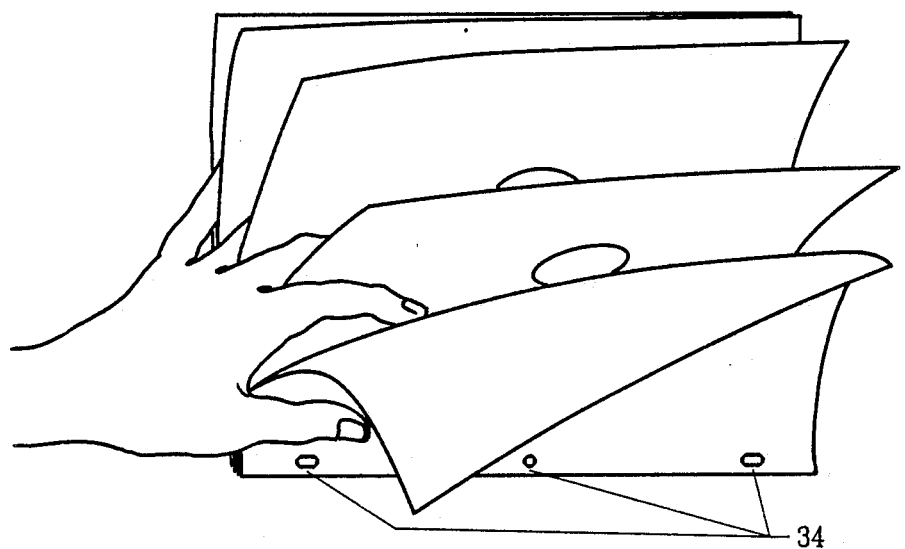
Figure 5: Prior Art
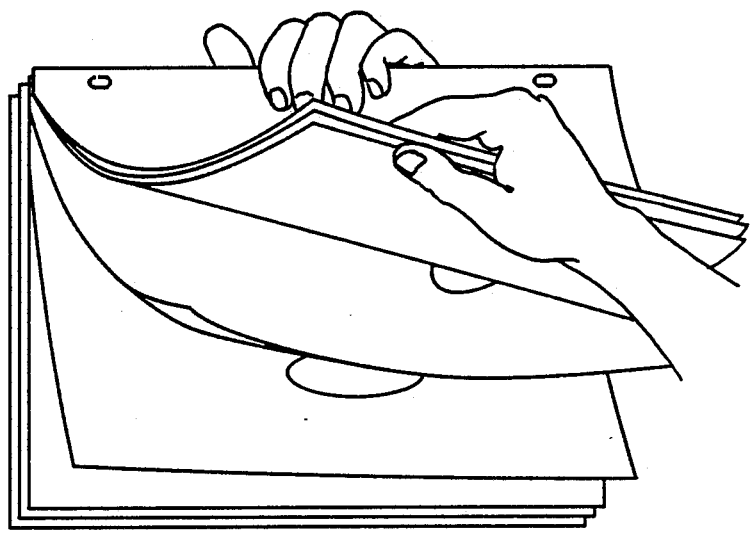
Figure 6: Prior Art

Figure 7: Prior Art
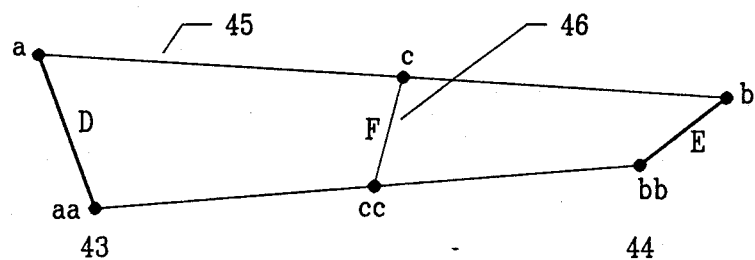
Figure 8: Prior Art
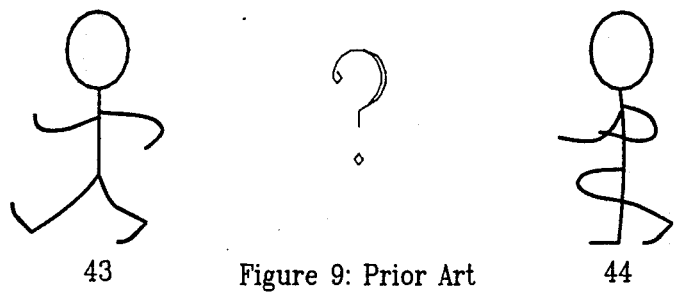
Figure 9: Prior Art
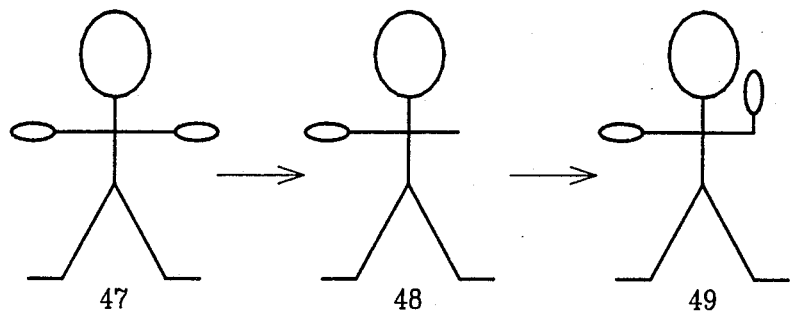
Figure 10: Prior Art

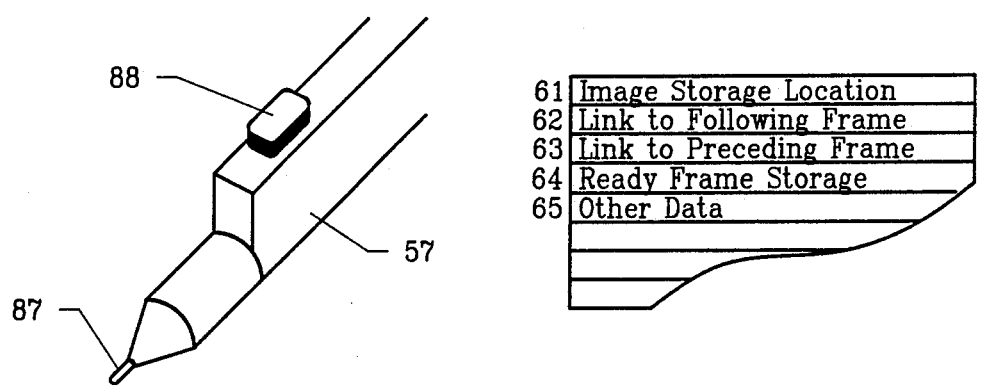
Figure 12
Figure 13
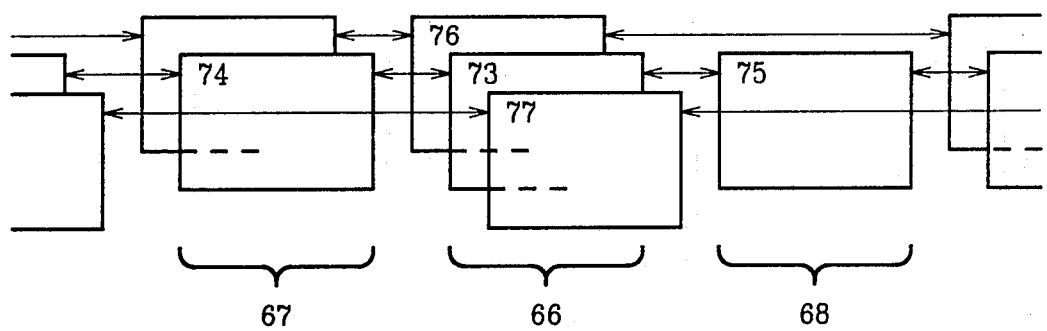
Figure 14
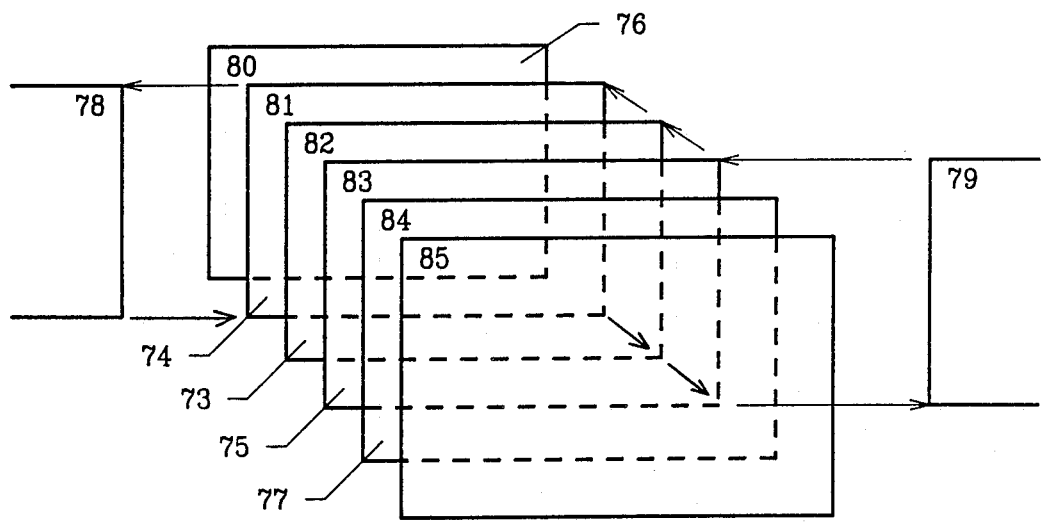
Figure 15

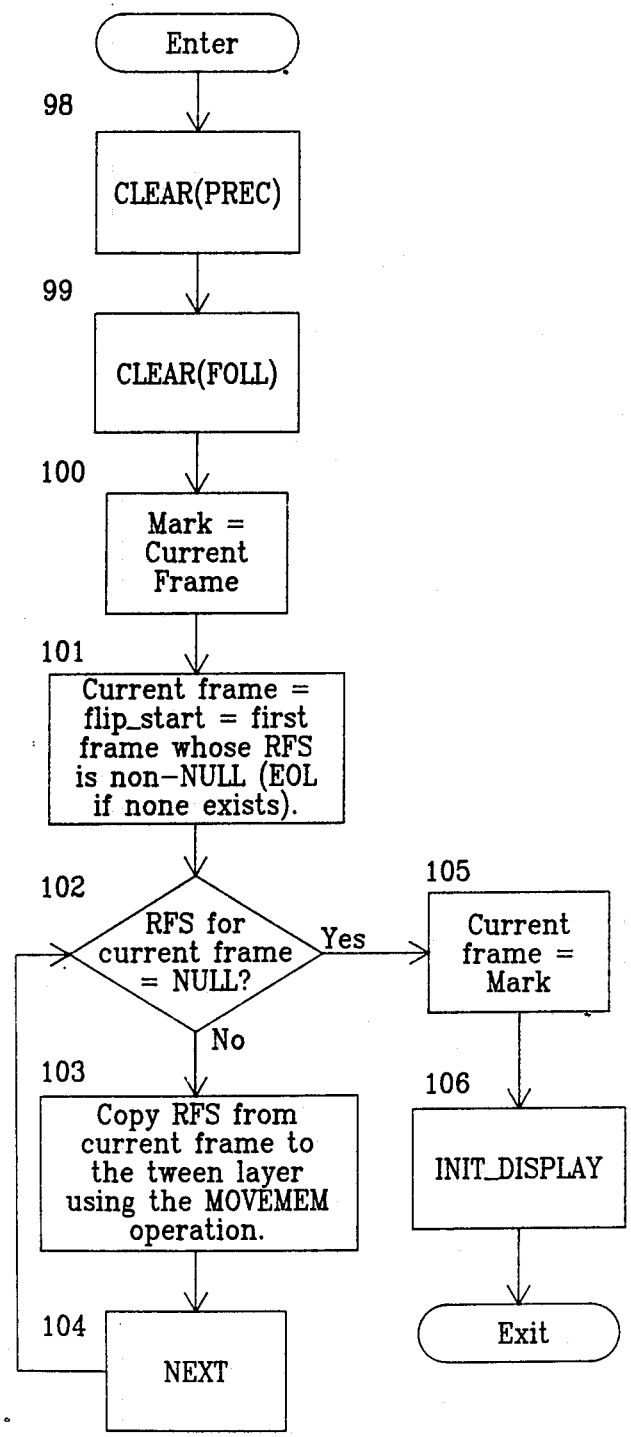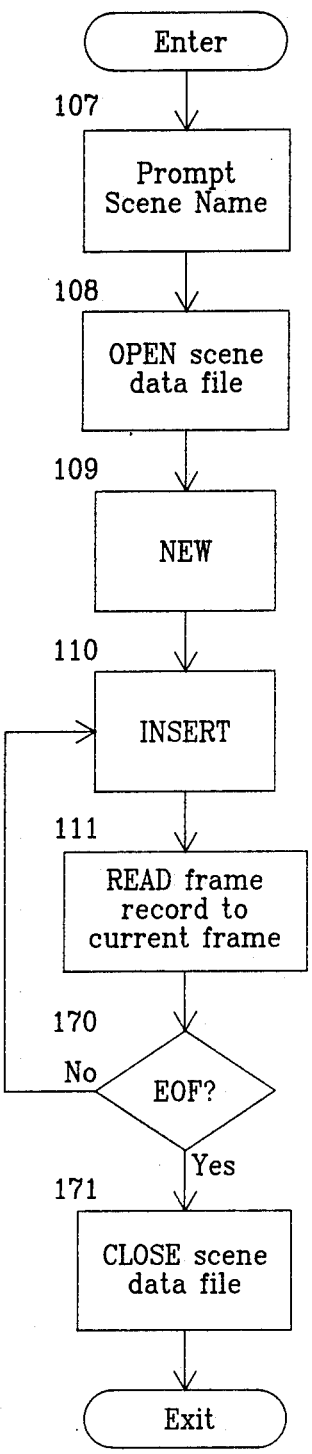
Figure 19
Figure 20

METHOD AND APPARATUS FOR PRODUCING ANIMATED DRAWINGS AND IN-BETWEEN DRAWINGS

BACKGROUND

1. Field of the Invention

This invention relates to animated drawings, particularly to a method for creating drawings in sequence, especially for animation, with the use of electronic graphics equipment.

2. Description of Prior Art

The art of animation is the creation of an illusion of motion by rapidly displaying a series of drawings, each drawing showing a stage of movement slightly changed from the one before. The optical illusion of motion is caused by the persistence of vision. Some people insist, however, that animation is more than just showing movement: it is about creating a feeling of life and character in a cartoon figure. This is a justifiable argument since the word "animate" really means "to make alive." There are many well known such cartoon characters who many people consider to be "real." The thought that Bugs Bunny or Bulwinkle are drawings never occurs to most people who know and enjoy these personalities. Thus this kind of animation is also known as "character animation" or "cartoon animation."

Heretofore, many methods for producing hand-drawn animated drawings and of generating animated drawings using electronic-computers have been tried. Many of these methods have been considerably successful. They are used to produce several thousand minutes of animated pictures each year. While methods have been developed using computers in which a human artist can make still drawings, very little has been done for the traditional art of cartoon or hand-drawn character animation. Animation is still made using paper, pencil, hand inked and hand painted clear acetate sheets, and movie film—despite the cost of labor, time, and mess involved—primarily because of the artistic freedom and control it provides over present computer methods.

A glossary of words describing conventional animation concepts and some computer terminology is provided below. These terms are used throughout this patent description.

GLOSSARY animation—1. making drawings appear to move. 2. making drawings appear to be alive and thinking.

animator—One who practices the art of animation.

bitplane—A two-dimensional matrix of binary information often used in computer graphics to display pictures. One bitplane can represent black and white (on or off). Two bitplanes hold enough information for four colors. Three bitplanes display 8 colors, and so forth. The number of colors available is 2 raised to the power n, where n is the number of bitplanes.

cel—A sheet of transparent material on which an opaque figure is painted. The cel is then placed over a background. The background shows through where the figure is not covering it. "Cel" comes from the word "celluloid," the first material used for these sheets.

display—1. An area of memory in a computer that is set aside for the direct translation of data to a display device. 2. Such data as it appears on the display device.

digitize—to convert an image into digital format. One method uses the signal from a video camera. Another method, using a drawing tablet, senses the x, y coordinate position of an electromagnet which induces a current in a wire grid.

exposure sheet—A list of all drawings or cels in an animation with instructions for exposing them before a camera. These include information on the number of cel levels per frame, which background or foreground to use, and any optical effects made with the camera. An exposure sheet also contains a breakdown of the sound track with specific cues so that the animator can synchronize drawings with sound.

extreme drawing—The drawing of the most extreme position of an action. For example, the highest point of a swinging pendulum.

flipping—A crude method for viewing animation. While holding a stack of drawings on paper firmly at one end, the stack is bent slightly at the other end and pages are released one at a time, in rapid succession.

frame—A single image of a sequence is a frame, as in a movie film.

frame-by-frame—handling a sequence of images for a motion picture one at a time.

in-between—A drawing that is made to fit between two extreme drawings or between other in-betweens. Many in-between drawings are used to create a slow action. The accuracy of the in-between is critical to realistic and smooth animation.

interpolation—A mathematical means for creating in-betweens based on finding the midpoint or a series of points between two key points. A drawing can be made of points connected by lines. If two different drawings are made and both drawings have the same number of points, an in-between drawing can be made by finding the midpoints between corresponding points in the two drawings.

light box—a box or a stand supporting a piece of transparent or frosted glass or plastic. The glass is lit from behind so that certain opaque paper placed on it appears as translucent.

model sheet—A group of drawings on one sheet that demonstrate the correct proportions and appearance of a character. The sheet usually shows all views—i.e., top, front, back, profile—and demonstrates various expressions as well.

paint system—An electronic-computer based program which allows a user to interactively "draw and paint" by turning pixels on or off. A paint system usually also has other features which imitate conventional graphic tools, such as airbrush, stencils, cut-and-paste, etc.

path-line—A line representing the path of motion an object will take. This line is used as reference for a group of in-betweens. The path-line is usually an arc.

pencil test—A test recording made from an animator's pencil drawings to check the progress of animation before the production of inking and painting begins. This test is usually made on film or video tape. Each pencil drawing must be placed before the camera for an individual exposure.

pixel—One dot in a two-dimensional array of dots that make up a digital image. Comes from picture (pix) element (el).

pointer—A small arrow, target, or other object displayed superposed on an image to show the x, y coordinate position of the current display address or pixel to be manipulated.

pose planning—A method of animation where all important poses a character will take to complete a scene are planned out and drawn first. Poses are often used as extreme drawings for in-betweening.

solid modeling—a technique of computer graphics where mathematical formulas are used to create the illusion of solid objects by displaying the two-dimensional projections of three-dimensional geometrically and parimetrically defined objects and shading their surfaces as if they absorb and reflect light.

straight-ahead animation—a method of animation where slight changes are made from one drawing to the next using only the preceding drawing for reference.

raster based—a method of displaying digital images using bitplanes. Each pixel has one or more addressable memory locations uniquely associated with it to define its color. Successive addresses correspond to successive pixels in sequence from left to right and top to bottom through the display.

rotoscoping—a method of tracing images from movie film onto paper.

user interface—The part of a computer program that allows a user to interact with it. The most common user interfaces use keyboard commands and/or mouse buttons, along with the position of a pointer or cursor in a display.

THE CURRENT MOST USED METHOD OF DRAWING CHARACTER ANIMATION

The current practice of producing animation using paper, paint, acetate sheets called cels, and film is a laborious procedure whose history is shown in a series of U.S. patents. John Bray, in U.S. Pat. No. 1,107,193 (1914), first introduced the notion of separating still or background elements from moving elements and figures. This allowed still elements to be drawn only once. Earl Hurd, in U.S. Pat. No. 1,143,542 (1915), introduced a more practical method for doing so, and Frank Lyle Goldman, in U.S. Pat. No. 1,715,127 (1929), taught an improved method of registering sheets of cel material.

FIG. 1 depicts pose planning as practiced in the prior art. Most animation that is hand drawn currently begins when an artist draws a series of rough position poses on paper. Note how the artist has drawn the animator's mark, followed by the character in five sequential views which show the significant poses needed to describe the animated sequence.

"Extreme" drawings are then made which describe the most extreme positions of an object in motion from one pose to the next. For example if the character in FIG. 1 took five steps to get from far off in the distance to the coffee cup in the foreground a drawing would be made for each stride at the place where her feet are furthest apart. In some cases, the extreme drawings are the same as the poses. This would be the case for the rest of the animation in that piece.

FIG. 2, Extreme Drawings, shows an exploded view of two registered sheets of translucent paper 30 with extreme drawings given reference numerals 31. These are the extreme positions or the furthest extension of the feet in a stride.

Drawings two through seven must be filled in for the movement to be smooth and realistic. The dotted projection lines in FIG. 2 show how three punched holes 32 on each sheet are registered so that the drawings are placed properly.

After the extreme drawings are made, in-between drawings must be filled in. The difference between each drawing must be comparatively slight, consistent, and of the proper character. Then the object in the drawings will seem to move smoothly and naturally when the pictures are displayed rapidly in sequence. The artist's skill in rendering a natural and smooth movement is applied in the craft of in-betweening.

IN-BETWEENING

In-betweening is the act of making the drawings that will be displayed between the extremes. FIG. 3 shows sequential drawings 60 with pegs registered in holes 32 and a light source 33. In-between drawings are made on translucent bond paper 30 which is opaque when lit from the top and somewhat transparent when lit from behind. The paper is punched with holes 32 and pegs 34 are inserted through the holes to hold the drawings in place. This way the position of the object in each drawing remains constant relative to a fixed reference.

FIG. 4 shows how in-betweens are drawn. Two consecutive extreme drawings 35 and 36 on sheets 37 and 38 are stacked one on top of the other over a light source and on pegs for registration as described above. The animator then places a new sheet of paper 39 on top of the stack. Extreme drawings 35 and 36 are visible through top sheet 39. Using the two extreme drawings 35 and 36 for reference, path-lines 40 are drawn on the top sheet 39 showing the paths which will be traced by the motion of various parts of the object being animated.

Still another sheet 41, is added to the top of the stack. The object 42 is then drawn on sheet 41 somewhere midway along the path line 40, and in-between the two extreme drawings 35 and 36. The animator uses the two extreme drawings and path line as reference for position and size of all minor parts of the new, in-between drawing.

The in-between drawing just created may now be used as an extreme drawing with which to create further in-between drawings. All in-betweens should follow the same path-lines; therefore, it is usual for the path-line drawings to be made on a separate sheet of paper. Thus, they can be used with all of the drawings in the motion sequence they define.

Another method of animation, called "straight-ahead" animation does not use in-betweening at all. This animation is still done with a light source and peg registration but only the preceding drawing is used as reference for the changes made in the next drawing. Since this kind on animation lacks control and smoothness, it is not usually used for "character animation."

HAND FLIPPING

During the course of animating the animator frequently needs to view the motion so that he knows how to make changes in his drawings. One method, illustrated in FIG. 5, is called rolling. While the sheets are still on pegs 34, the animator holds a sheet between each finger and examines them in order. This method is only marginally helpful in giving the animator a sense of the motion and is limited to five sheets by the number of spaces between fingers on the animators hand.

When many in-betweens have been made the animator may stack several together in sequence, as shown in FIG. 6. While firmly holding one edge, the stack is bent slightly at the other edge and pages are released one-by-one in rapid succession. This is a crude method of judging the smoothness and correctness of the in-betweens in animation. These steps are repeated until enough in-between drawings have been made for the timing of the action to be correct by the animator's judgement.

Drawings are continually re-sequenced and shuffled for tracing. Sheets must be numbered to be kept in sequence.

PENCIL TESTING

The drawings cannot be seen in animation at true speed until a "pencil test" is made. A pencil test is made by actually "shooting" (photographing or video-taping) the rough pencil drawings, frame by frame, onto film or video tape. This is not done frequently since it is time consuming. It is usually delegated to a "camera person."

If the pencil test is made on film, it takes a day or two to return from the processing lab and is expensive. Video tape recorders that are capable of single frame recording are an improvement. With these the results are ready for viewing as soon as shooting is finished; however, the machines are expensive and the job is still time consuming.

The animator uses the pencil test to judge the drawings. The drawings are then re-worked, the pencil test remade, and so forth, until a satisfactory animated effect is achieved.

FINISHING

When all drawings are complete, a similarly punched clear acetate sheet, known as a "cel", is stacked over each drawing and the drawings are traced onto the respective cels with ink. For color, the back of each cel is painted with opaque paint.

Finally, the cels are cleaned, checked, combined with other cels, laid over a painted background, and photographed.

Much handling of the cels is involved. Dust, fingerprints, and smudges are a constant problem. Each cel must be carefully cleaned after it is finished. Since hundreds of cels are created even for a few seconds of animation, the task becomes very time consuming and expensive.

When an error is made in painting a cel it sometimes must be remade anew, beginning with the inking step. Since individual drawings and cels must be assigned for processing among dozens of workers, they are sometimes misplaced. Also, the paint on the cels takes hours to dry.

Sometimes several layers of cels are used for complex animations. Different parts of the animation are painted onto separate cels. Cel paint must be mixed to slightly different shades so that colors appear to match when covered with a differing number of layers of cel material. Cel paint must also be carefully matched from batch to batch. Moreover, once painted and cleaned, cels must be re-ordered and painstakingly checked before being photographed.

Further, cels, cel paint, and the numerous skilled workers required for these repetitious tasks increase budget requirements for the production of animations. Because of these disadvantages, few animations of over thirty minutes length are attempted. Although Disney studios "Snow White," "Pinnochio," and others are notable exceptions, producers have had difficulty financing feature length (one hour or more) projects on the scale of those films.

Many other methods have been tried which attempt to make animation production easier. Although many of them have not caught on, they indicate the great desirability of a better animation method.

OTHER METHODS

Various inventors have drawn moving and static figures on non-transparent materials. Thereafter, either the figure or the surrounding area is cut away so that a background drawing or layers of drawing will show through the cut away area. These eliminate some of the problems of inking and painting cels. Examples of these techniques are taught in U.S. Pat. Nos. 1,179,068 (1916) to John R. Bray, 2,091,144 (1935) to Raymond McShea Freil, 2,958,257 (1960) to William V. Traeger, 3,228,742 (1966) to David D. Hand, 3,168,742 (1965) to Jack Dean Chambers, and 3,556,646 (1971) to Juan and Armando Guidi.

These methods replace inking and painting of cels with cutting and re-registering pieces of drawings. In practice, it has been easier to paint cels with colors pre-mixed with attention to the number of intervening layers of cel material which will be superposed over them. If drawings are to be re-used, they are inked from the originals in any desired position.

Still others have promoted photo-reproductive methods for tracing and/or compositing images filmed, or drawn on film or other material. Examples of these techniques are taught in U.S. Pat. Nos. 1,261,648 (1918) granted to Paul H. Terry, 1,375,918 (1921) to Carl F. Lederer, 17,330 (1929) to Frank D. Williams Reissue, 1,715,230 (1929) to William A. Gilmartin, 1,805,511 (1931) to Arthur Wiltsee Carpenter, 1,815,251 (1931) to Frank Lyle Goldman, 2,130,541 (1938) to Max Fleischer, 2,351,634 (1944) and 2,450,017 (1948) to Robert Place, and 3,809,463 (1974) to Paul Winchell. These require expensive and involved means of reproduction.

Many machines have been shown for keeping multiple sheets in register and to assist in tracing, drawing, and photographing the cels. Examples of these techniques are taught in U.S. Pat. Nos. 1,198,598 (1916) granted to Charles L. Suddmann, 1,260,393 (1918) to Eliot Keen, 1,633,547 (1927) to Earl Hurd, 1,715,127 (1929) to Frank Lyle Golman, 1,805,511 (1931) to Arther Wiltsee Carpenter, 1,919,735 (1933) to George Lane, and 2,153,902 (1939) to Albert W. Tondreau.

These methods are undesirable because they call for much handling of cel material; physically moving the materials to a work station other than the one on which the drawings were made; marking, ordering, sequencing and checking the order and correct sequence of the cels to be photographed; lighting cels under a camera; or using plates or other devices for holding multiple cels flatly in the focal plane of a camera.

Among the above-mentioned inventions, the Keen patent is of particular note. In Keen's invention, several sheets of transparent material may be drawn on, rearranged, and moved independently. Each sheet is on a movable arm so that it can be swung into and out of the picture plane without losing register. When a motion cannot be effected by moving one of the sheets, then a part of that sheet can be erased and redrawn, or replaced with a new drawing. Multiple sheets may be placed down with the one to be drawn or traced on top. Background sheets may be arranged on the bottom and foreground sheets on top. The drawing shows five independently movable sheets. Keen even provides an incremental scale for moving the planes a fixed amount at each exposure.

This type of apparatus requires a great deal of forethought and planning of the animation to make full use of its labor saving properties. The labor spent on planning, clipping the delicate sheets of acetate into the arms, and making the moves on the arms while in front of the camera can easily equal the time saved.

A few machines have attempted to provide reference to other drawings during the creation of new drawings. Most give reference only to the preceding drawing, limiting the artist to an animate-forward technique. Many of these involve the use of long strips of cel material on rolls. Examples of these techniques are taught in U.S. Pat. Nos. 1,198,598 (1916) to Charles L. Sudmann, 1,235,871 (1917) to Carroll M. Aument, 3,350,158 (1967) to Frederick R. Blattner, 3,390,939 (1968) to Jean-Charles Paracuellos, 3,441,343 (1969) to Claude Piron et. al., 3,506,343 (1970) and 3,888,572 (1975) to Jean Veran Dejoux, 3,747,087 (1973) to Lee Harrison III et. al., and 3,905,692 (1975) to Kelly Hart.

The only one of these machines which uses the in-between technique is that of Dejoux. His machine provides for in-betweening on a continuous strip of cel material to the extent that the drawings are made on the correct frame of the strip where they will appear when the strip is projected or reproduced. The intervening frames where in-betweens will be drawn must be left blank. Slack is taken up from the strip in two spaces between three platforms. Drawings are made on the center platform, on which the preceding and following drawings from the other two platforms are reflected.

The main disadvantage of Dejoux's method is that the position of the drawing must be pre-planned. In-betweens cannot be added or removed except by splicing, which would be impractical with such large strips. There is no facility for automatically advancing to the next frame which is to be in-betweened or for finding the two extremes. This must be carried out by manual search, which is already done with individual sheets.

These methods all use continuous strips which are awkward to color, especially if the work is to be divided among many persons, the paint must dry before the roll is advanced, and the paint may crack once rolled. Drawings must be made directly on the cel material where erasures and corrections may damage the look of the final image.

Another invention using a video camera and a computer to alleviate repetitious camera work is described in U.S. Pat. No. 4,346,403 granted to Shigeru Tamura (1982). Here, drawings are digitized with a video camera and stored in a memory. These may be replayed at any speed. Drawings may be inserted and deleted freely, and drawings can be reproduced and sequences repeated. Essentially, Tamura's invention is a pencil testing device in which only the drawings which change need be rephotographed for each new test.

Although some camera work is saved, the step is not eliminated. The drawings still need to be made on paper and then exposed individually to a camera. Further, video cameras are not sensitive enough to capture pencil drawings well. Fine lines are either muddy or lost.

Passing reference should be made to U.S. Pat. No. 1,422,527 granted to Berger (1922). Here, two successive drawings making up a two-frame animation are printed in two primary colors and viewed successively through two respectively colored glasses so that they may appear to switch from one position to the other and back again. The use of this method for stereo pictures is also described.

This invention is relevant only in that primary colors are used to show two positions of an animation. The secondary color made by mixing the two primaries is used where the positions overlap. No mention is made of the images changing color, of them being two extremes for reference in in-betweening, or of them being separate images in two frames of a longer animation. Clearly Berger has not considered temporarily superimposing two frames of an animation in two colors for reference in drawing a third frame.

ELECTRONIC COMPUTER GENERATED ANIMATION

Heretofore, the application of computers to animation has primarily been in an attempt to save the animator from making all of the in-between drawings, generating them by computational means instead of manually. The favored direction in the field is to eliminate drawing altogether, creating forms by mathematical means in three-dimensional coordinate systems and applying concepts of projective geometry to generate images of them.

This does not help artists who wish to make drawings and only want to be free of the drudgery of traditional cel animation methods. Also, many artists do not want or are unable to use mathematical concepts. Computational methods also have a tendency to be inflexible. Some of the computational methods used currently are described below.

INTERPOLATED OR METAMORPHIC COMPUTER ANIMATION

In interpolated or metamorphic computer animation the artist begins by making "key" drawings. Key drawings are similar to poses or extremes. The difference is that they are usually geometric shapes rather than figures that can strike a "pose." This method is usually restricted to geometric shapes because the artist must make the drawings by entering points connected by lines.

As shown in FIG. 7, one key drawing 43 is made by points a and aa connected by line segment D. A second key drawing 44 is made by points b and bb connected by line segment E.

In FIG. 8, a correspondence is created between the points in one drawing and those in the next. A curved or linear path 45 is calculated over which the points are interpolated. New drawings are created and displayed by the computer based on the interpolated points. As an example, interpolated in-between 46 is the line segment F connecting points c and cc which are the midpoints of the path line 45.

This works out well if the drawings are simple and geometric. Character motion is complex, as with the walking figure shown in FIG. 9 which moves forward from 44 to 43 while the arms and legs move relative to the torso. For this, interpolation is exponentially more difficult.

Unless thousands of closely spaced points are controlled, the interpolation method produces very square, angular drawings much like the drawings that result from children's connect-the-dots puzzles. However, if more than a few points are used, an unreasonably large amount of computing time is required to calculate all of the required new positions. When the number of points changes from one position to the next, even more calculations are required.

SOLID MODELING

Solid Modeling is another popular method of computer animation. This method creates animation by describing an object to the computer using points in three-dimensions. A set of environmental factors are described to the computer, such as the reflective properties of an object, lighting, perspective, and viewing position and direction. A function describing the way in which each of these factors change over time is described to the computer, which then creates the described series of images. This method is very effective for creating geometrically or parametrically definable objects, real or imagined.

Solid modeling is useful for scientists and mathematicians who want to visualize large amounts of scientific data or complex equations, but is not especially suitable for artistic expression. The methods of defining objects and motions in terms of mathematical models are difficult to master and require training and discipline very different than what the traditional artist is used to. The rigors of mathematics—no matter how "friendly" the user interface—may never suit the artist's need for the kind of intuitive expression provided by drawing.

Often an artist must go against mathematical precision to make images more expressive. Artists do not always want to follow the laws of perspective. They can put both eyes on the same side of the profile for a more expressive look. They can stretch and shrink limbs for emphasis on the action.

Although drawing every frame for an animation is time consuming, for certain purposes drawing is easier than telling a computer the numbers required to make moving images. For example the many complex changes that take place in the muscles of the face can be suggested with one well drawn expressive line—one stroke of the hand. It is very difficult to tell a computer how to make that change.

Solid modeling, like metamorphic processes, is also limited by computational power. There must be few enough points, objects, and little enough detail that each image may be calculated within a reasonably short amount of time. For some animations, thousands of computers have been used, each doing a portion of the work. Sometimes a "reasonably short" time is measured in days, usually in hours.

Graphic effects of moving shapes, letters, logos, and so forth can be generated efficiently by the methods of solid modeling. In an article by Geoffrey Gardner, "Simulation of Scenes Using Textured Quadratic Surfaces." Computer Graphics, ACM SIGGRAPH, New York, Vol. 18, No. 3, pp. 11–20, 1984, natural scenes such as terrains, clouds, trees, etc. are generated and displayed quickly enough that they appear as if we are moving past them at speeds required for a convincing flight simulation. This requires extremely fast and expensive computers, and the creative possibilities are limited by the simple shapes and textures which must be used.

A strong leaning toward increased realism and away from expressiveness in computer graphics is reflected in the Coons Award Lecture of Donald P. Greenberg, printed in Communications of the ACM, New York, pp. 123–129, p. 151, Feb. 1988. He encourages a trend toward increased realism through actual computer simulation of physical phenomena.

Another article indicating the general direction of discussion concerning animation using computers may be found in the article entitled "Traditional animators talk about computer animation at SIGGRAPH panel." IEEE Computer Graphics & Algorithms, pp. 66–67, Sept., 1987. The methods and systems described are clearly advancing the methods of solid modeling and do not help animators who want to draw.

In recent years, an organization by called PIXAR in San Rafael California, has created a number of naturalistic computer generated animations. It is notable that, while the still portions of these animations contain many natural features, the animated characters retain a synthetic look.

Two of the films, "Luxo Jr." and "Red's Dream," animate otherwise inanimate, man-made objects which naturally lend themselves to solid modeling. A third, "The Adventures of Andre and Wally B.," animates a human and a bumble bee, both constructed with connected and embedded oblong shapes painted with details. Both of these characters succeed because they are relatively abstract. All three films have convincing and expressive motion quality learned from a study of classical animation drawing techniques (Lasseter, John; "Principles of Traditional Animation Applied to 3D Computer Animation." Computer Graphics, ACM SIGGRAPH, New York, Vol. 21, No. 4, pp. 35–44, 1987).

The films succeed by carefully limiting their choice of subject to that which can be modeled well using geometric shapes. Though successful as animated shorts, the pieces were not economically successful because of the number of human and computer hours involved in their production.

ELECTRONIC - COMPUTER "CEL" ANIMATION

Other types of animation software on computers require the animator to draw separate pictures, but ignore the in-betweening method in pursuit of another method more related to computers. They use the computer's ability to erase a portion of an image and refill it with a new image.

FIG. 10 illustrates a "draw and erase" method. Here, the animator starts with an original drawing 47 which is then saved to disk or a portion of memory. The part that changes is then erased 48 and drawn in a new position 49. A rectangle (not shown) is used to enclose the portion that is changed. This portion is saved separately on the disk or in another portion of memory. The changes to the drawings are then displayed in rapid sequence from memory or disk.

The major limitation on this method is that, with the exception of the drawing being erased, the animator cannot see what came before and what follows. The animator cannot keep incremental changes even or in correct relation. The results are jerky and inconsistent, even amateurish.

The other objection to this method has been computer memory limitations. Usually only a small area is used for the animation because many drawings are needed and they must all fit into memory.

Most of the games found on personal computers and in arcades use animation of this type. A small rectangle containing successive drawings of the animated shape is moved over a background by repeatedly compositing the image over the background in each successive position, replacing background behind the image as it is moved. This capability is available on many home computers.

It is possible to do cutout animation by this method of the sort seen on the well known television program, "Monty Python's Flying Circus." Here one is limited to stylized, cut-out type productions.

PAINT SYSTEMS

Still, there are devotees of in-betweening who realize that computer paint systems will ease the coloring and storage of images. Drawings on paper may be digitized for the computer by placing the drawings before a video camera or tracing them on digitizing tablets. An article describing this method can be found in Evans, Jeff. "The Illusion of Life: Traditional Character Animation on the Amiga." Amiga World, Peterborough, NH, pp. 13-18, Sept./Oct., 1986.

However, the task of digitizing each and every drawing can negate any advantage gained in coloring. Video cameras do not give as sharp an image as most would like. Often the drawings must be re-traced after having been digitized, just as if they were being inked onto cels. Tablets do not always have the same aspect ratio as the display monitor, resulting in an image which is horizontally or vertically stretched, tracing is laborious, and the result is never as fresh as the origional.

A review of the general capabilities generally found in a computer paint system may be found in Abigail Reifsnyder's review of "Deluxe Paint." Amiga World, Peterborough, NH, pp. 72-74, Mar./Apr., 1986.

Some paint systems have tools required to make in-betweens with reference to extremes. The use of the tools is not straightforward; thus, not surprisingly, we are not aware of anyone else who has applied the tools sometimes available in a paint system to this purpose. The tools required are:

(1) the ability to do a simple merge (logical OR) of two drawings
(2) the ability to change the color of a line drawing to a second and third color and
(3) the ability to selectively remove lines of a given color.

The steps taken are as follows:

(1) Extreme drawings are made and stored on disk.
(2) One extreme drawing is loaded from disk storage and made to be a color, say red.
(3) Another extreme drawing is loaded, merged with the first, and made a second color, say green.
(4) The in-between is drawn in a third color, usually black. The red and the green extreme drawings are used to judge the spacing and arrangement.
(5) The lines of a color given to the extremes are removed.
(6) The new in-between is stored on disk.

In 1985, one of us (Rose) created an animation by this method. This was recorded on film for a fifteen second work entitled "The Bubble." However, the separate steps required were awkward and time consuming. They were also confusing because they required an extended series of commands on any paint system. Extra work was involved in combining and then separating the drawings. Furthermore, it was difficult to keep track of the sequence of the drawings. In the end, it was found to be more difficult to animate by this method than by conventional paper and cel methods.

In Summary, the prior art of conventional animation requires much labor in the form of re-drawing, re-shuffling, tracing, painting, and recording for pencil tests or the final product. It requires attention to mechanical details such as minor differences in shades of paint and dust specs on individual drawings, and; it requires extensive organizational strategies to keep the drawings and cels in order. Most improvements made in this area have resulted in a loss of flexibility to the animator.

The prior art of electronic or computer animation requires intense mathematical manipulation which is impractical on complex objects. Paint programs which simulate drawing are not applicable to the organizational problems inherent in animation, making their use for animation more difficult than conventional methods.

OBJECTS AND ADVANTAGES

Accordingly, several objects and advantages of our invention are to provide a method and apparatus for animation where many drawings are created and kept in sequence, where successive drawings may be made with reference to preceding and following drawings, thus maintaining proper size and proportional relationships. Further, drawings to fine-tune the timing of an action, making for very smooth and consistent animation.

There are important advantages related to other electronic computer techniques. The greater expressiveness inherent in the art of drawing may be achieved. Drawing "cheats" are an indispensable tool for expressing character. An arm for example, might be stretched to twice its normal length for drama and to cut a readable silhouette. To do something as simple as this to a mathematical model would take considerable effort. The animator may draw free-hand, erase, and redraw as desired. The ease and freedom of expression in free-hand drawing has many advantages over the somewhat awkward and involved techniques of solid modeling.

Our method is versatile. Other computer generated images or digitized images can be incorporated as long as their data formats are known. For example, if a synthetic or "high-tech" look was desired, images generated by solid modeling could be loaded into the system and modified by drawing, mixed with other drawing, or used as backgrounds to the animated drawings. Drawings on paper can be incorporated by first digitizing them. Technical drawings or views from a CAD system could be incorporated as a background for animated illustration of an industrial process.

Our method can be readily used and understood by people schooled in conventional animation without their having to understand concepts of mathematics or of sculpture. People doing conventional cel animation by the manual method will be the people most likely to recognize the value of our method and want to make use of it.

Our method is fast. The animator does not have to number drawings or reshuffle them for in-betweening and shooting. The drawings are always in sequence and appropriate reference drawings displayed automatically.

The most startling advantage is the ability to animate the drawings instantly as a pencil test. The animator can, upon command at any time while drawing, display the sequence of drawings at the correct speed of the final animation.

The pencil test can be repeated after small changes without additional labor or expense. This makes more efficient use of the animator's time and gives the animator more freedom to experiment.

The drawings can be colored on the computer using the techniques of two dimensional computer graphics. For example, whole areas can be instantly flooded with flat or textured color.

The medium itself is flexible. Erasure leaves a clean "surface." There is no smudging, dirtying, or wearing of a piece of paper.

There are no cels to handle, ink, paint, and keep clean.

The drawings made by the animator are used in their original form. The animator's hand is not taken out of the drawings as when they are inked onto cels in the conventional technique.

When the animation is finished, all of the drawings, already in correct sequence, can be sent to a film or video recorder or any other output device automatically. Each drawing does not have to be handled individually by a camera person.

Finally, the computer can offer drawing tools that would be difficult to match conventionally. For example, the computer can transform any part of the drawing to any size and rotate it to any angle. The computer can cut out a piece of a drawing and put it down anywhere on any picture.

One may object that cels are sometimes painted with an airbrush. Techniques are available which mimic the visual effect and artistic feel of the airbrush.

Our method can easily include other known computer techniques to simulate a full range of conventional animation and/or film-making tools. For example tracing from still frames of live action film or video is made easier and more accurate because the drawing can be added directly to a digital copy of a still frame.

Further objects and advantages of our invention will become apparent from a consideration of the drawings and ensuing description.

DESCRIPTION OF THE DRAWINGS

FIG. 3: Shows an expanded view showing sequential drawings from an animation on sheets registered with pegs in front of a light source as implemented in prior-art techniques.

FIG. 4: Shows an isometric view of an in-between drawing being made with reference to two extreme drawings with a path line as implemented in prior art techniques.

FIG. 5: Illustrates the handling of sheets of animation drawings for the prior-art technique of "rolling."

FIG. 6: Illustrates the handling of sheets of animation drawings for the prior-art technique of "flipping."

FIG. 7: Shows the two key positions of a simple model for the prior art of "Interpolation."

FIG. 8: Shows the new position of the simple model generated by an electronic computer in the prior art of "Interpolation."

FIG. 9: Illustrates difficult key drawings for the prior art of "Interpolation."

FIG. 10: Illustrates steps taken in the prior art technique of "Draw-and-erase."

FIG. 12: Shows a detail of the stylus drawn in perspective, showing tip and barrel buttons.

FIG. 13: Shows a schematic representation of the frame record.

FIG. 14: Illustrates an isometric exploded schematic representation of the scene as an ordered list of frames, showing combinations which might occur of new or altered backgrounds and/or foregrounds.

FIG. 15: Illustrates a perspective exploded schematic representation of the display in relation to the current frame, separated into layers.

FIG. 19: Shows a flow chart of the logic used for displaying frames rapidly in sequence.

FIG. 20: Shows a flow chart of the logic used for loading a scene from disk.

DRAWING REFERENCE NUMERALS

Figure 1:
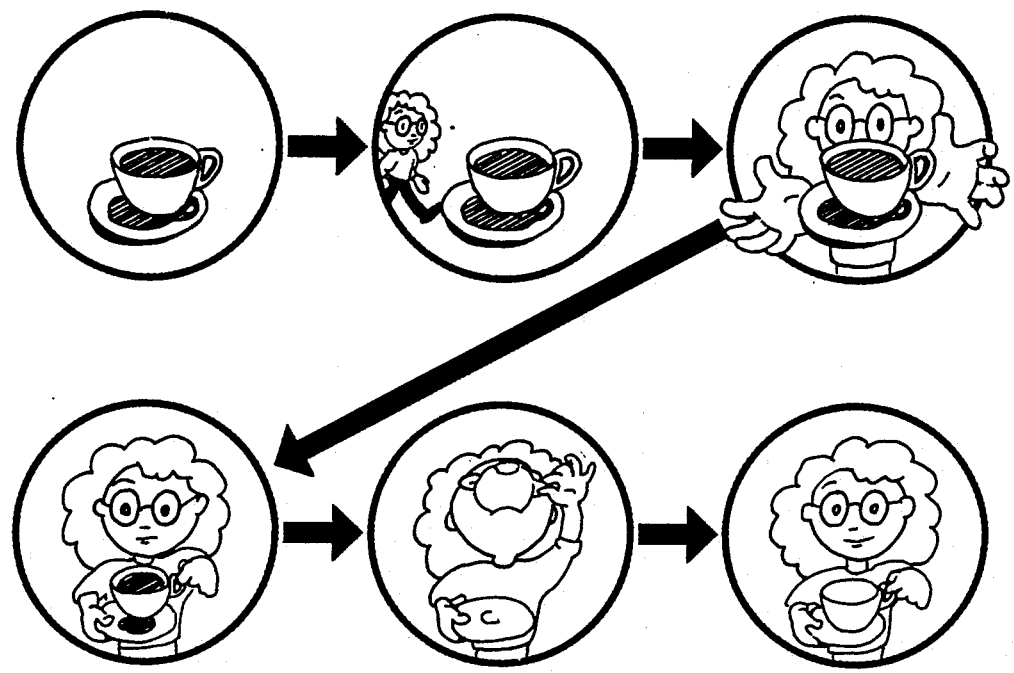
FIG. 1: Illustrates rough position poses drawn by an animator as created in prior-art techniques.
Figure 2:
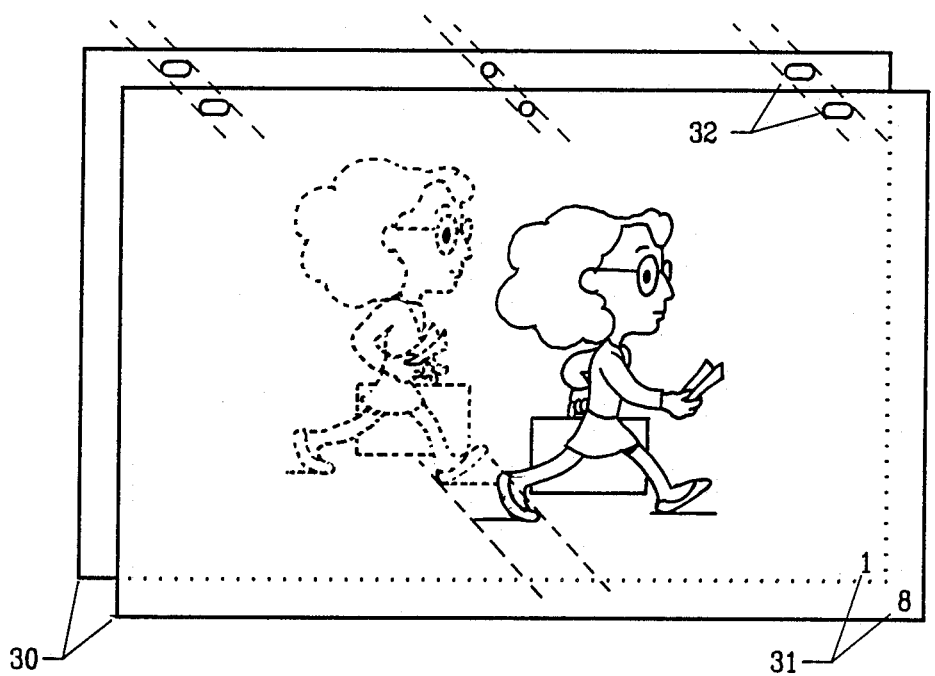
FIG. 2: Shows an isometric view of two extreme drawings on registered, translucent sheets as implemented in prior-art techniques.

30 Translucent Paper
31 Reference Numerals
32 Registration Holes
33 Light Source
34 Pegs
35 Preceding Extreme Drawing
36 Following Extreme Drawing
37 Preceding Extreme Sheet
38 Following Extreme Sheet
39 Path Line Sheet
40 Path Line Drawing
41 In-between Sheet
42 In-between Drawing
43 Key Drawing 1
44 Key Drawing 2
45 Calculated Path Line
46 Interpolated In-between
47 Origional Digital Drawing
48 Drawing Partially Erased
49 Erased Part Redrawn in a New Position
50 Permanent Storage
51 Display
52 Frame Buffer
53 CPU
54 Additional RAM
55 Keyboard
56 Tablet
57 Stylus 58 Pointer
59 Command Boxes
60 Sequential Drawings
61 Image Storage Location
62 Link to Following Frame
63 Link to Preceding Frame
64 Ready Frame Storage
65 Other Data
66 Current Frame
67 Preceding Frame
68 Following Frame
69 Bitplanes
70 Bits
71 Bit Combinations
72 Pixel
73 Current Tween
74 Preceding Tween
75 Following Tween
76 Background
77 Foreground
78 Previous Tween
79 Succeeding Tween
80 Background Layer
81 Preceding Layer
82 Current Layer
83 Following Layer
84 Foreground Layer
85 Path Layer
86 Color Selection Circuitry
87 Tip Switch
88 Barrel Switch
137 Add Following command box
143 Add Preceding command box
148 Preceding command box
155 Following command box
162 Flip command box

DESCRIPTION OF THE STRUCTURE—COMPONENTS AND MATERIALS

Figure 11:
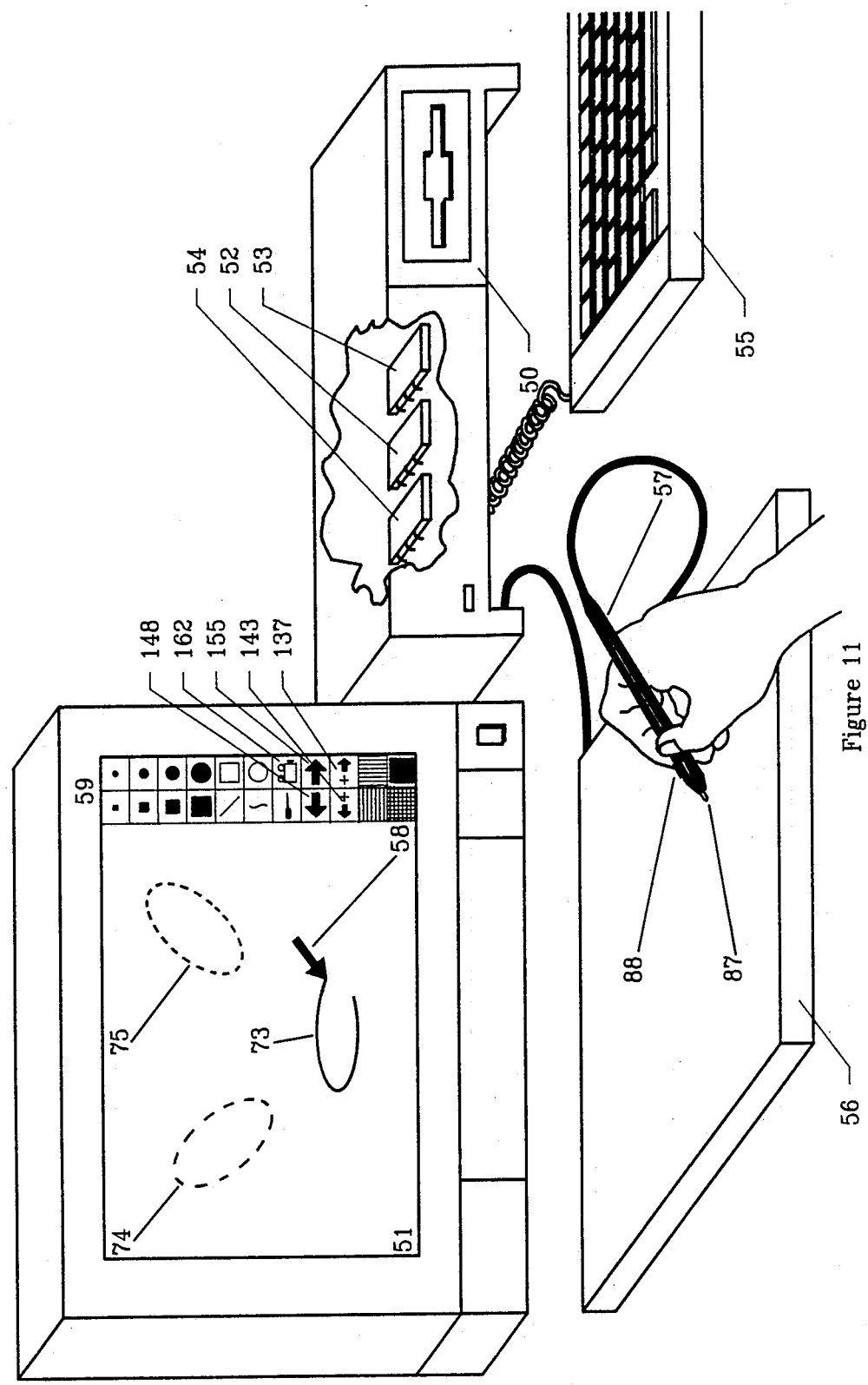
FIG. 11: Shows a perspective view of the equipment typically used in an implementation of the present invention.

A preferred embodiment of the process of our invention is carried out on an electronic device or configuration of devices which use the components and materials shown in FIG. 11.

(1) A permanent storage device 50 is used to store data; preferably permanent storage 50 is a random access storage medium such as a hard magnetic disk with 20 Mb or greater capacity and tape backup. This permanent storage device is sometimes referred to as "the disk," and records written upon it as "files."

(2) A visual display device 51, such as a video monitor, which can display at least three colors or multiple shades, not counting the background.

(3) A frame buffer, or place reserved in RAM (read-/writable Random Access Memory) 52 stores digital information that describes what is to be seen on display 51. Frame buffer 52 must be able to represent at least three colors or shades of a color, not counting the background. The most suitable system is a raster-based, bit-mapped display system with at least three bit planes.

(4) A central processing unit (CPU) or set of processors 53 capable of performing high speed and/or high bandwidth data transfer operations, arithmetic and logical operations, and logic execution control; also CPU 53 is capable of managing ordered lists. We have found the general purpose Motorola 68000 series Integrated Circuit (IC) sufficient, but certainly the Intel 80386 or specialized ICs will also do the job. One example of a specialized IC is a blitter, which does transfer and set operations on rectangular areas within or enclosing bit-maps.

(5) Additional RAM 54 directly addressable by CPU 53. It is desirable to have at least one Megabyte of RAM independent of the frame buffer. (6) A keyboard 55 upon which keystrokes, key combinations, and sequences of keystrokes may be read and interpreted.

(7) An electronic graphics tablet 56 and stylus 57 which move pointer 58 on display 51 and which may be used to indicate command boxes 59 and to draw current tween 73.

(8) A computer readable program (not shown) to implement the functions of drawing and displaying and other functions described in more detail later in this section.

For the development and prototyping of this invention we have used an Amiga(tm) computer, which uses a general purpose Motorola 68000 microprocessor IC ("Amiga" is a trade mark of Commodore International, Inc.); a 3½ inch floppy disk storage device; a color video monitor; and an MM-Series electronic graphics tablet manufactured by Summagraphics Corporation.

The Amiga computer has a bit-mapped, raster-based display system with up to six bitplanes. All of the equipment is production model home or business equipment that is widely available.

FIG. 12 shows a detail of stylus 57 clearly showing tip switch 87 and barrel switch 88 which may be used to engage commands.

THE FRAME

A frame consists minimally of the data describing one image, drawn by the animator, called a "tween." It may also contain other information. For example, it may have a number representing the length of time the frame will be displayed, names of background and foreground image files, foreground and background scrolling information, timing information and so forth. The data record for a frame shown in FIG. 13 contains the image storage location 61, links 62 and 63 to the following and preceding frames, ready frame storage 64 which locates a block of additional RAM 54 containing a copy of the tween which can be rapidly duplicated in the display. Other data 65 needed for extending upon the essential features may be appended to the frame data record.

The tween drawing derives its name from its in-between relation to the drawings in preceding and following frames 67 and 68. The terms "tween," "in-between," "drawing," and "tween drawing" may be used in different contexts to indicate the image data associated with a frame in the scene at that frame's image storage location 61.

The descriptive data for the frame may reference more data kept separately on permanent storage device 50. For example, we have kept the image data for the tween drawings as separate files on disk. Thus image storage location 61 is the name of the file containing the tween drawing.

THE SCENE

A scene is an ordered list of frames. An isometric exploded schematic representation of a scene, which is made up of layered drawings in frames, is shown in FIG. 14.

Many scenes might be edited together to form a movie, or a movie might be composed of a single scene. This is a matter of convenience to the animator.

Preceding, Current, and Following Frames 67, 66, and 68 each have a frame record associated with them. In the frame record for current frame 66, link to preceding frame 63 points to the frame record for preceding frame 67. Link to following frame 62 locates following frame 68. Image Storage location 61 locates the image data for current tween 73. Other items in the frame record could be used to locate the image data for background 76 and foreground 77.

The animator can position himself at a particular frame in the scene by "moving" forward, causing following frame 68 to become the current frame, or backward, causing preceding frame 67 to become the current frame. There is always one current frame 66, which is the frame that may be drawn or altered, and which may be any one of the frames in the scene.

The animator can insert a blank frame at any position in the scene and then draw on that frame. Since preceding and following frames 67 and 68 are also visible in the display, the new drawing can be made in-between them, as is further discussed below.

THE DISPLAY

FIG. 15 shows a perspective exploded schematic representation of the display as used in this method. The display is composed of a number of layers. The ordering of the layers is not critical. Any sensible arrangement is acceptable.

Current tween 73 from current frame 66 is visible on current layer 82 of the display. Preceding tween 74 from preceding frame 67 is visible on preceding layer 81 of the display. Following tween 75 from following frame 68 is visible on following layer 83 of the display.

If they are implemented, background and foreground 76 and 77 from current frame 66 are visible on background and foreground layers 80 and 84 of the display.

Thus it may be seen that current tween 73, preceding tween 74, and following tween 75 are all registered in the display. Additional previous and succeeding tweens could optionally be included. For most applications, the one preceding and following tween is sufficient.

FIG. 15 shows how the arrangement of preceding, following and current tweens 74, 75, and 73 is maintained automatically as the animator moves forward and backward through the scene. The same number of preceding and following frames relative to the current frame are always visible, provided they exist.

As shown by the arrows, when the animator issues the command to move forward, preceding tween 74 leaves the display and becomes new previous tween 78. Current tween 73 moves to preceding layer 81 and becomes new preceding tween 74. Following tween 75 moves to current layer 82 and becomes new current tween 73. Succeeding tween 79 enters the display on following layer 83 as new following tween 75. The opposite operation occurs when the animator moves in reverse.

These first three layers are essential. As extensions to this methods, more layers may be added in practice which enhance the usefulness of this method.

Background and foreground 76 and 77 may be displayed together with the preceding, current, and following tweens 74, 73, and 75. We have found it best to display background and foreground layers 80 and 84 such that each is a different monochrome shade distinguishable from tween layers 81, 82, and 83. Frame buffers with more bitplanes have the capability to display these as fully colored drawings. This may or may not be preferable when creating tween drawings, but is certainly desirable when the layers are combined for finishing and exhibition.

Having the foreground and/or background in the display gives the animator the capability to separate static elements from moving elements and to match parts of the moving figure to those static elements. Take as an example a man climbing a ladder. The man is moving and is drawn on tweens. The ladder is stationary and is in the background. The hands and feet of the man must land on the rungs of the ladder. It is easy to draw them this way if the current tween is superimposed on the background.

The final element which may be included in the display is a path layer 85. This is also kept separate, displayed together with, and distinguishable from the other elements in the display.

Path layer 85 is particularly useful for sketching path lines as a guide for particular motions, where the motion will take place along the path line. The path drawing surface need not be stored with any frames or even with the scene. It is meant as a temporary surface on which reference marks may be made.

CREATING A LAYERED DISPLAY USING BITPLANES

Figure 16:
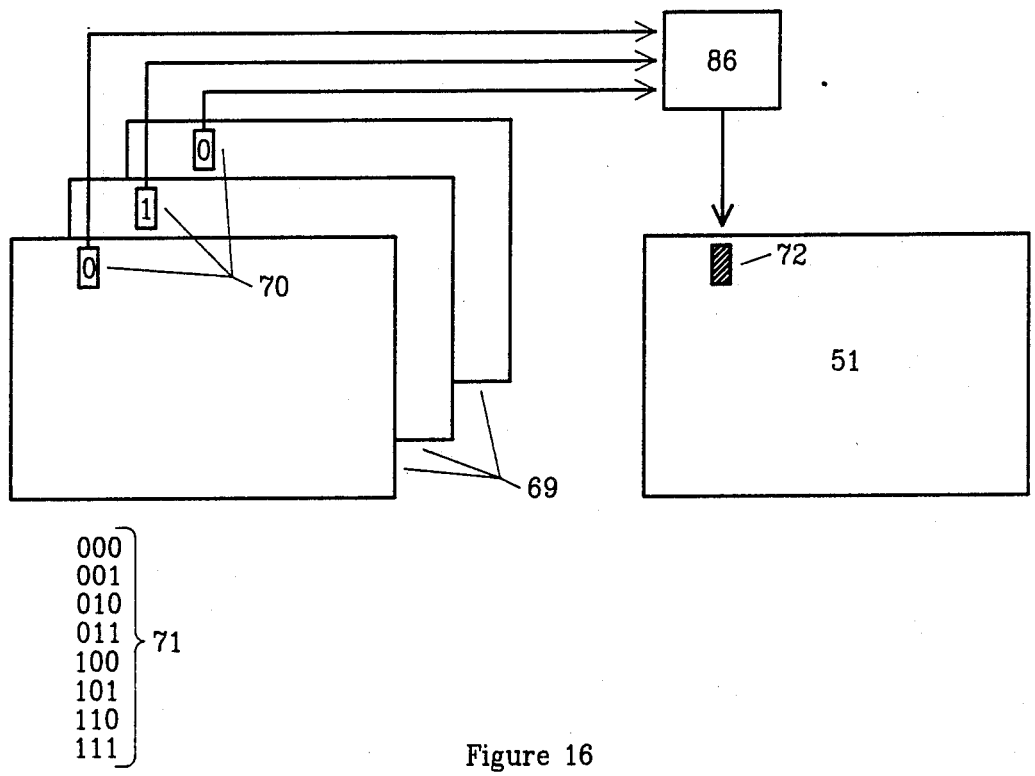
FIG. 16: Shows a schematic representation of color selection and image representation in a bit-mapped raster digital display.

The logic of frame buffer 52 is shown schematically in FIG. 16. Bitplanes 69 are two-dimensional matrices of binary information often used in computer graphics to display pictures. One bitplane would be used to display a black and white image (one or zero). Two bitplanes can display four colors or levels of gray. Three bitplanes can display eight colors, and so forth.

The location of pixel 72 in display 51 corresponds to the location of bits 70 in bitplanes 69.

Bit combinations 71 are derived from all possible permutations of bit values zero and one taken over all bits 70 at a given location on bitplanes 69.

Color selection circuitry 86 assigns each of bit combinations 71 a color with which to illuminate pixel 72 in display 51.

Figure 17:
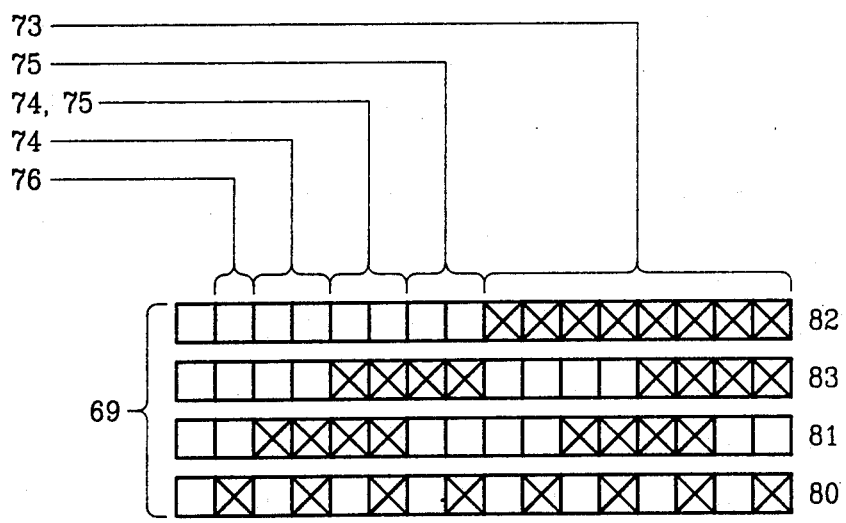
FIG. 17: Shows a schematic representation of bit plane combinations which may be used in a bit-mapped raster display to represent layers of drawings.

The layers of the display are conveniently implemented by associating them with individual bitplanes 69, as illustrated in FIG. 17. Current layer 82, following layer 83, and preceding layer 81 are each assigned one of bitplanes 69 in the frame buffer. The presence or absence of image is there represented by a crossed or blank square.

Separate storage must be maintained for each of layers 80 through 85 of the display, thus; it is preferred to have a one to one mapping between bit planes and layers, as shown. CPU 53 displays the contents of bitplanes 69 in frame buffer 52 on display 51. Bitplanes 69, and thus the layers, are superposed in display 51.

Each of the layers in the display is color coded by assigning color values to bit combinations 71 which occur in the one to one mapping of layers to bitplanes 69. Colors are chosen so that each layer may be distinguished from the others. The ground is white, or very light gray; preceding layer 81 is light red or pink; current layer 82 is black; following layer 83 is light green; background and foreground layers 80 and 84 are gray; and path layer 85 is red. Any color scheme will do provided it is effective. The color scheme might even be made to be adjustable by the animator. Shades of gray or of a single color could be used. For clarity we find it best to use different colors to distinguish the layers.

The display is quite readable given one preceding and one following drawing, current drawing, background, foreground, and path lines. It is sometimes desirable to remove one or more of these elements. By reassigning the color associated with bit combinations 71, any of the layers may be toggled from visible to invisible to visible again, and so forth.

Thus the display is made up of many layers, each separate but displayed together in such a manner that each may be distinguished. Tweens, and possibly backgrounds and/or foregrounds from successive and prior frames leave and enter the display according to the location of the current frame in the scene.

DRAWING TWEENS

The way current, preceding, and following layers 82, 81, and 83 might look to an animator is shown in FIG. 11. Assume that current tween 73 is in black. The animator is shown finishing an oval she is drawing. When she moves stylus 57 over tablet 56, pointer 58 follows her movements to show where she is drawing. Preferably, preceding tween 74 is pink and following tween 75 is light green.

The current tween may be drawn and altered using any of the techniques for drawing known in the art of two-dimensional computer graphics. Minimally, the artist can draw and erase. More precisely, any dot in the display may be turned on or off.

We have provided methods for drawing by changing a circular patch of pixels on or off. The size of the circle can be varied from a single pixel up to many pixels in diameter. In our implementation the size of the circular patch, or "brush," is selected by pressing one of the numbered keys on keyboard 55. The brush effects a mark which is fat or thin depending on the size selected.

The display of preceding and following drawings facilitates the creation of drawings in-between two extreme drawings. It is by this method of creating new drawings relative to other drawings in sequence that the artist produces animation.

FLIPPING

We define flipping as the process of showing a series of frames in rapid succession at true speed, or at some fraction or multiple of true speed. The name is carried over from the manual method, in which one edge of a stack of drawings is held up with one hand and successive drawings are allowed to fall in rapid succession from above the thumb and into view.

In our process the animator may see upon demand how the drawings look in animation. In effect, he can view an instant pencil test.

At the animator's command, those tweens in RAM 54 located by ready frame storage 64 fields in a series of frame records may be displayed in rapid sequence. Delays may be added according to any timing information optionally included in each frame record. This gives the animator an instantaneous view of the animation at true speed, as it will appear when finished.

In general, we want to display a new tween every 1/30th second. Our mass storage medium does not provide sufficient speed of data transfer to bring the data for one entire image to the display in a short enough time to give animation at true speed.

The method we have used for flipping is to hold frames local to the current frame ready in RAM. As the animator moves forward and backward through the scene the tween drawing associated with each frame is brought from RAM 54 (if found there) or from disk 50 to frame buffer 52. When the drawing is altered and the animator moves to another frame, the drawing is saved to disk 50 and copied to RAM 54. The use of RAM 54 for the storage of images is managed in such a way that a contiguous series of tweens local to current frame 66 are kept at hand. Tweens in memory can be moved to the display within the short time required for true speed viewing.

When memory is short, frames at the extreme beginning or end of the sequence of frames in memory are discarded from memory. They remain, of course, on disk. If memory runs out when the animator is moving forward over succeeding frames, then the first frame in memory is discarded. If he is moving backward over prior frames, then the last frame in memory is discarded. The amount of memory allocated for the storage of frames may be increased, decreased, or otherwise limited as required in the implementation.

When the animator moves arbitrarily to another frame in the scene which is not contained in the sequence of ready frames currently available, then all of those ready frames are discarded from memory and the process of retaining local frames as the animator moves forward and backward in the scene begins anew.

Details of the maintenance of ready frames 64 and of the flip operation are further discussed in the sections below explaining the implementation of the "SAVE_TWEEN" and "FLIP" operations.

IMPLEMENTATION

Our implementation is input, or command driven; i.e., events occur at the command of the animator. The steps carried out upon each command are described below. Those skilled in the art of computer graphics and computer programming will be able to select appropriate components and write software to support the functions required to carry out this method.

While our implementation is in software, it would certainly be possible to make a firmware or hardware implementation. FIGS. 18 through 24 show flow charts outlining the control logic for our software, or program implementation.

Several basic operations must be available to the implementor. These are usually provided in software libraries published with a given computer or operating software, and may be implemented by those familiar with the art of computer programming and practice of computer science.

These operations—OPEN, READ, WRITE, CLOSE, MOVEMEM, ALLOCATE, NEW, INSERT, NEXT, and PREV—are now briefly described.

OPEN opens a file located on permanent storage medium. If the file does not exist it is created.

READ transfers a single record from an open file to RAM and advances in the file to the next record. If there are no more records in the file, READ indicates the end of the file (EOF) and no data is transferred.

WRITE writes a single record from RAM to an open file and advances in the file to the end of the record just written.

CLOSE closes a file. No reads or writes can be made to a file that has been closed (until it is opened again).

MOVEMEM copies data from one location in RAM to another.

ALLOCATE reserves a segment of RAM of specified size and returns the location of that reserved segment. If there is no segment of RAM large enough to fulfill the request, the special value NULL is returned.

NEW initializes a linked list of records in RAM. A linked list (or simply list) is unlike a file in that it is organized for traversal in both a forward and backward direction, and for arbitrary insertion and removal of records.

INSERT adds a record to a list in front of a given record already in the list.

NEXT gives the record which comes after the current record in the list. If the current record is the last record in the list, NEXT indicates the end of the list (EOL) and the last record is returned.

PREV gives the record which comes before the current record in the list. If the current record is the first record in the list, PREV indicates the end of the list (EOL) and the first record is returned.

Other support functions which must be provided, more specific to this process, are LOAD([TWEEN, PREC, FOLL]), SAVE_TWEEN, FLIP, COPY([TWEEN, PREC, FOLL], [TWEEN, PREC, FOLL]), CLEAR([TWEEN, PREC, FOLL]), LOAD_SCENE, and INIT_DISPLAY.

Parenthesis surround control parameter for the operations and square brackets surround a list of possible values for each parameter.

TWEEN, PREC, and FOLL are values given to select current layer 82, preceding layer 81, or following layer 83 (visible in display 51) as the layer to be affected by the LOAD, COPY, and CLEAR commands.

LOAD([TWEEN, PREC, FOLL]) loads the image data associated with the current frame from permanent storage 50 to the TWEEN, PREC, or FOLL display layer as specified. The file containing the image information is identified by image storage location 61 in the frame record. The data is transferred to frame buffer 52 using the OPEN, READ, and CLOSE operations.

The LOAD operation is accelerated when a copy of the image data for the current frame is available in ready frame storage 64. In this case, the image data is transferred directly from RAM 54 to frame buffer 52 using the MOVEMEM opertion.

SAVE_TWEEN saves the image which has been drawn in current layer 82 to permanent storage 50 at image storage location 61, specified in frame record 66, using the OPEN, WRITE, and CLOSE operations. Additionally, SAVE_TWEEN checks for ready frame storage (RFS) 64. If it is found, the MOVEMEM operation transfers the image data to RFS 64. If RFS 64 has not been allocated, then SAVE_TWEEN allocates it using the ALLOCATE operation and then does the transfer.

Figure 18:
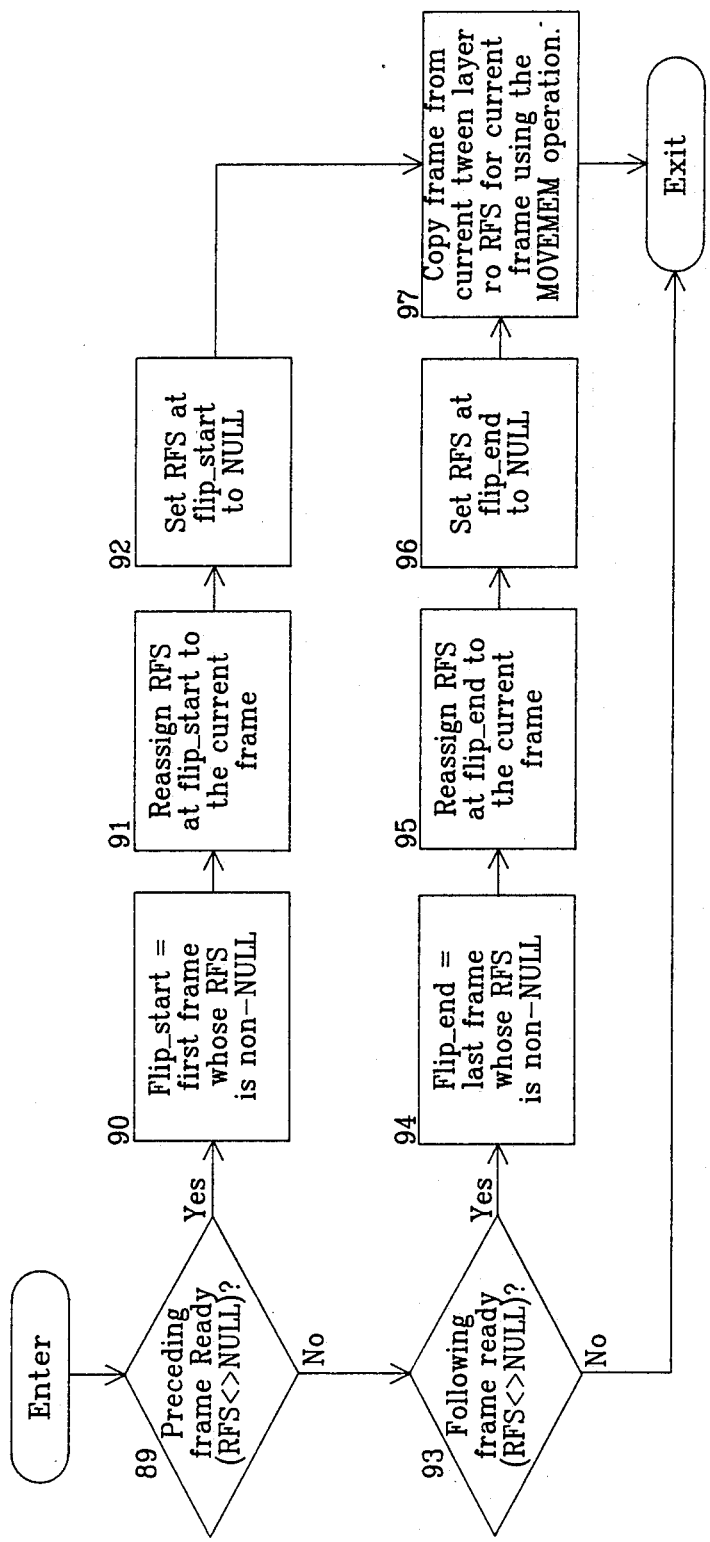
FIG. 18: Shows a flow chart of the logic used for maintaining a contiguous sequence of ready frames for flipping.

When ALLOCATE returns NULL, indicating that there is not enough RAM 54 remaining to fulfill the request, then the steps outlined in FIG. 18 ensue. At 89, SAVE_TWEEN checks to determine if RFS 64 of preceding frame 67 is NULL. If it is not, then at 90, "flip-start" is identified as the first frame in the scene whose RFS 64 is not NULL. At 91, SAVE_TWEEN reassigns RFS 64 from flip-start to current frame 66. At 92, RFS 64 at flip-start is set to NULL.

If at 89 RFS 64 for preceding frame 67 is NULL, then at 93, SAVE_TWEEN checks to determine if RFS 64 for following frame 68 is NULL. If it is not, then at 94, "flip-end" is identified as the first frame in the scene whose RFS 64 is not NULL. At 95, SAVE_TWEEN reassigns RFS 64 from flip-end to current frame 66. At 96, RFS 64 at flip-end is set to NULL.

If RFS 64 for current frame 66 was reassigned from flip-start or from flip-end, then at 97, SAVE_TWEEN copies the image data from current layer 82 to ready storage using the MOVEMEM operation.

The activity of SAVE_TWEEN with regards to ready frame storage makes possible the rapid display of the tween images from a contiguous series of frames in the scene.

FLIP rapidly displays the tween images from all ready frames found in RAM 54. This animates the drawings, giving the animator an immediate sense of the motion he is creating.

The operation of FLIP will be better understood by referring to FIG. 19. FLIP clears the display with the CLEAR operation (explained below) 98, 99. At 100, FLIP assigns a temporary variable "mark" to current frame 66 so that it can be restored after the flip is finished. At 101, FLIP identifies the first frame in the scene whose ready frame location 64 is non-null, and sets the current frame equal to this frame. At 102, FLIP checks to see whether ready frame storage 64 for the new current frame is NULL.

If not, then at 103, FLIP copies the image data from ready frame storage 64 to current layer 82 in display 51 using the MOVEMEM operation. There may optionally be a pause, then, at 104 FLIP advances to following frame 68 using the NEXT operation.

Looping back to 102, if ready frame storage 64 for the new current frame is NULL, then at 105, the frame that was current when FLIP was called (mark) is again assigned to current frame 66. At 106, FLIP invokes the INIT_DISPLAY operation (explained below) to restore the display, and then exits.

While ready frame storage 64 for each successive frame is non-NULL, there are more ready images to display and FLIP continues the loop with step 103.

COPY([TWEEN, PREC, FOLL], [TWEEN, PREC, FOLL]) COPY (from layer, to layer) duplicates the image data from the display layer specified by the first parameter ("from layer") in the display layer specified by the second parameter ("to layer"). For example COPY(TWEEN, PREC) duplicates the image data from current layer 82 in preceding layer 81.

CLEAR([TWEEN, PREC, FOLL]) overwrites the image data in the specified display layer with zeros, thus rendering it blank.

LOAD_SCENE reads a scene from permanent storage 50 into RAM 54. A detailed flow chart of the LOAD_SCENE operation is shown in FIG. 20. The software prompts the user to enter a name of a scene at 107. The OPEN operation opens (or creates) the scene file at 108. At 109, NEW initializes a scene list. The INSERT operation adds a new frame to the scene list at 110. At 111, LOAD_SCENE reads a frame record from the open scene file. At 170, we check the return from the READ operation.

While the end of file (EOF) has not been reached at 170, we loop back to 110 and add another frame with the INSERT operation. The loop continues until LOAD_SCENE detects EOF at 170, at which point the CLOSE operation closes the scene data file and LOAD_SCENE terminates.

Note that the program initializes at least one frame in the list to guarantee that a frame is available for the TWEEN layer of the display. This is true even if there were as yet no records to read from the scene data file.

Figure 21:
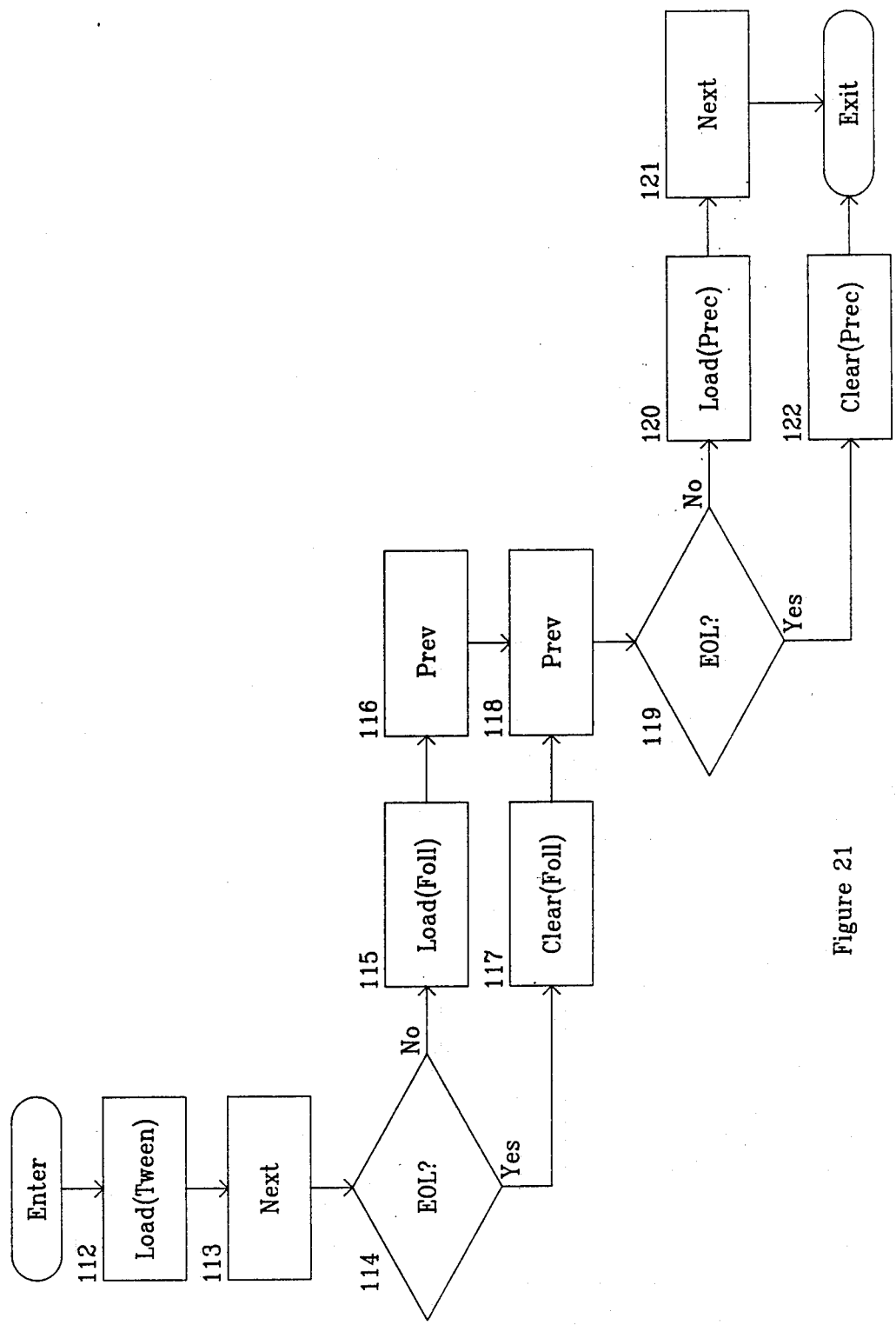
FIG. 21: Shows a flow chart of the logic used for initializing the display.

INIT_DISPLAY initializes the display as shown in detail by the flow chart in FIG. 21. First, the LOAD(-

TWEEN) operation at 112 loads the image data associated with current frame 66 to current layer 82. The NEXT operation at 113 advances to the following frame in the list or returns End of List (EOL). The program branches at 114 according to whether EOL was indicated by the NEXT operation.

If the NEXT operation did not return EOL, the LOAD(FOLL) operation at 115 loads the frame data from the new current frame to following tween layer 83 and the PREV operation at 116 returns to the frame origionally loaded to current layer 82.

If the NEXT operation did return EOL, then the CLEAR(FOLL) operation at 117 renders following layer 83 blank, because there is no following tween.

The PREV operation at 118 retreats to the preceding frame in the list or returns EOL. The program branches at 119 according to whether EOL was indicated by the PREV operation.

If the PREV operation did not return EOL, the LOAD(PREC) operation loads the frame data from the new current frame to preceding layer 81 and the NEXT operation at 150 returns to the frame origionally loaded to current layer 82.

If the PREV operation did return EOL, then the CLEAR(PREC) operation at 122 renders preceding layer 81 blank, because there is no preceding tween.

OPERATION

Figure 22:
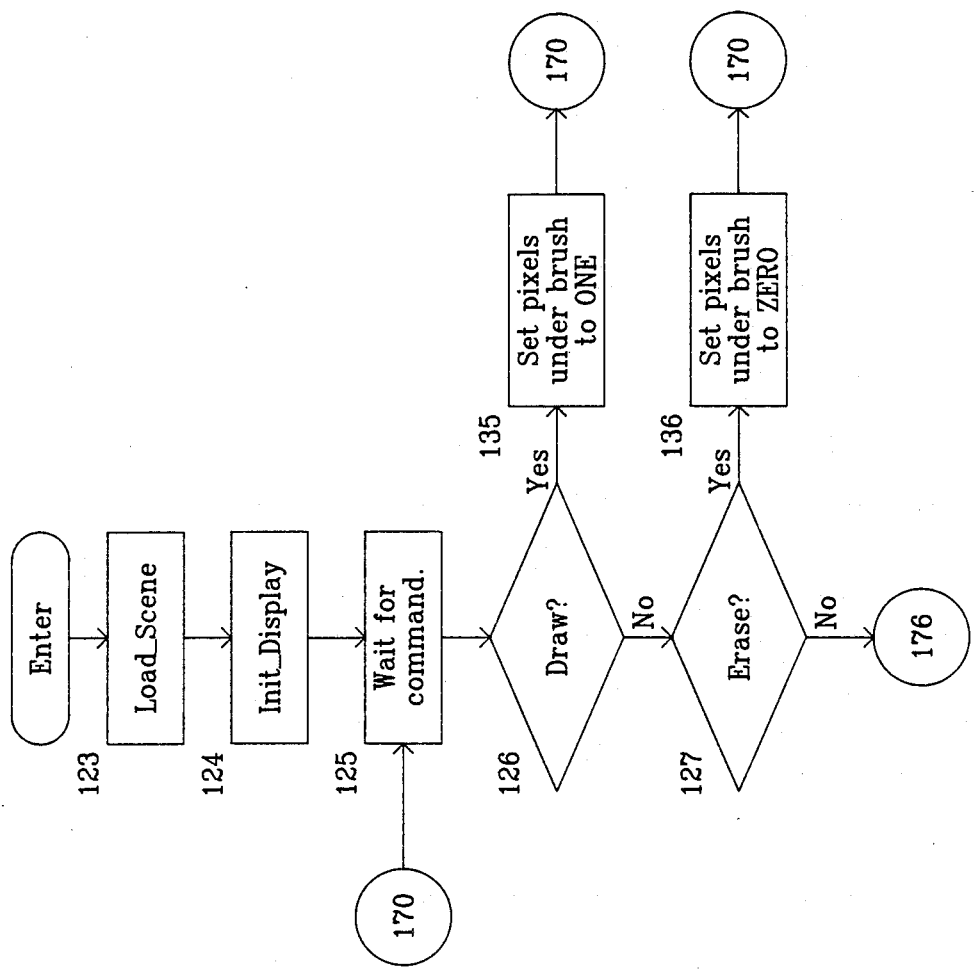
FIG. 22: Shows the first section of a flow chart of the logic used for executing the commands and functions available to the animator.
Figure 23:
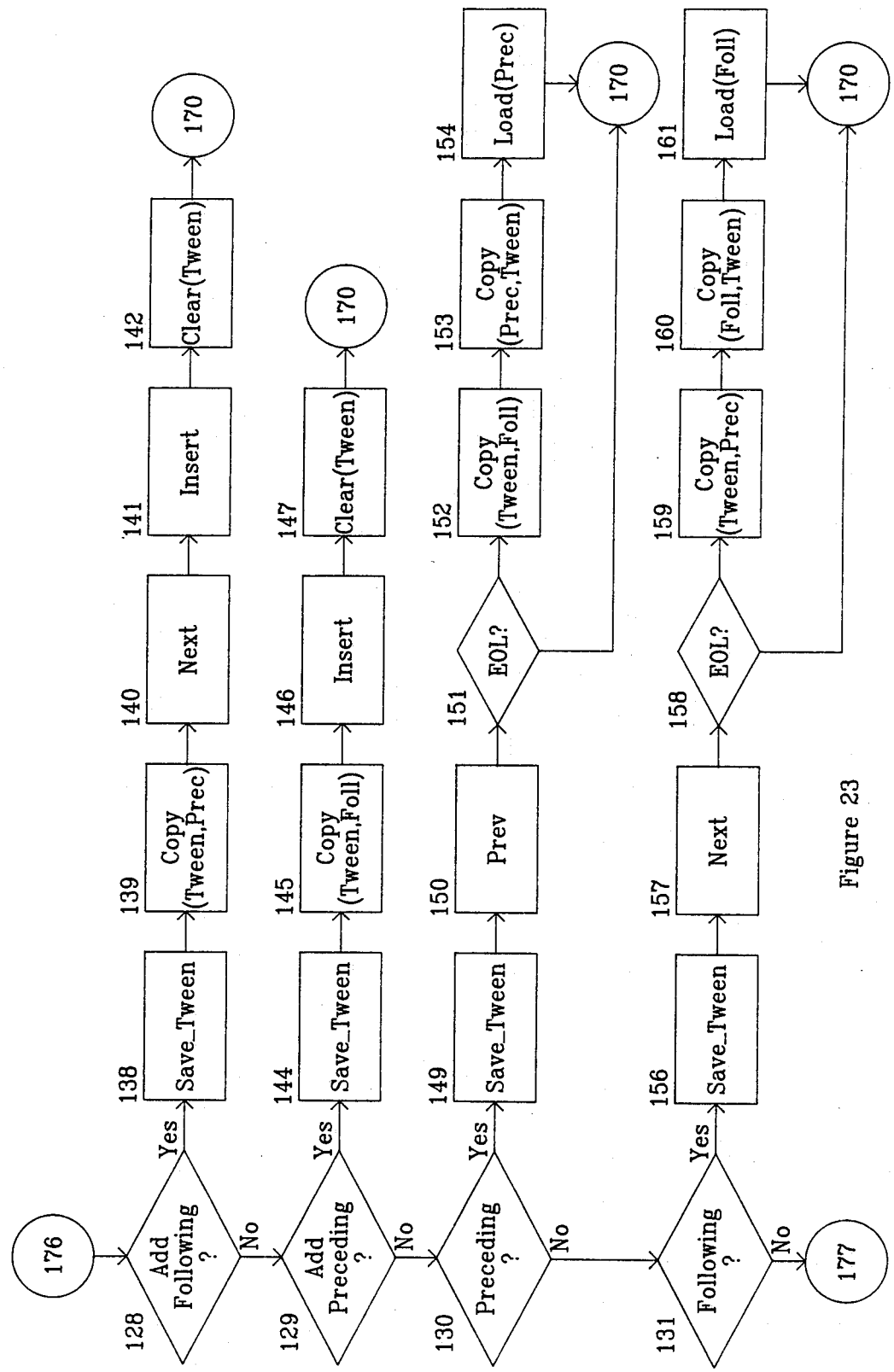
FIG. 23: Shows the second section of a flow chart of the command logic.
Figure 24:
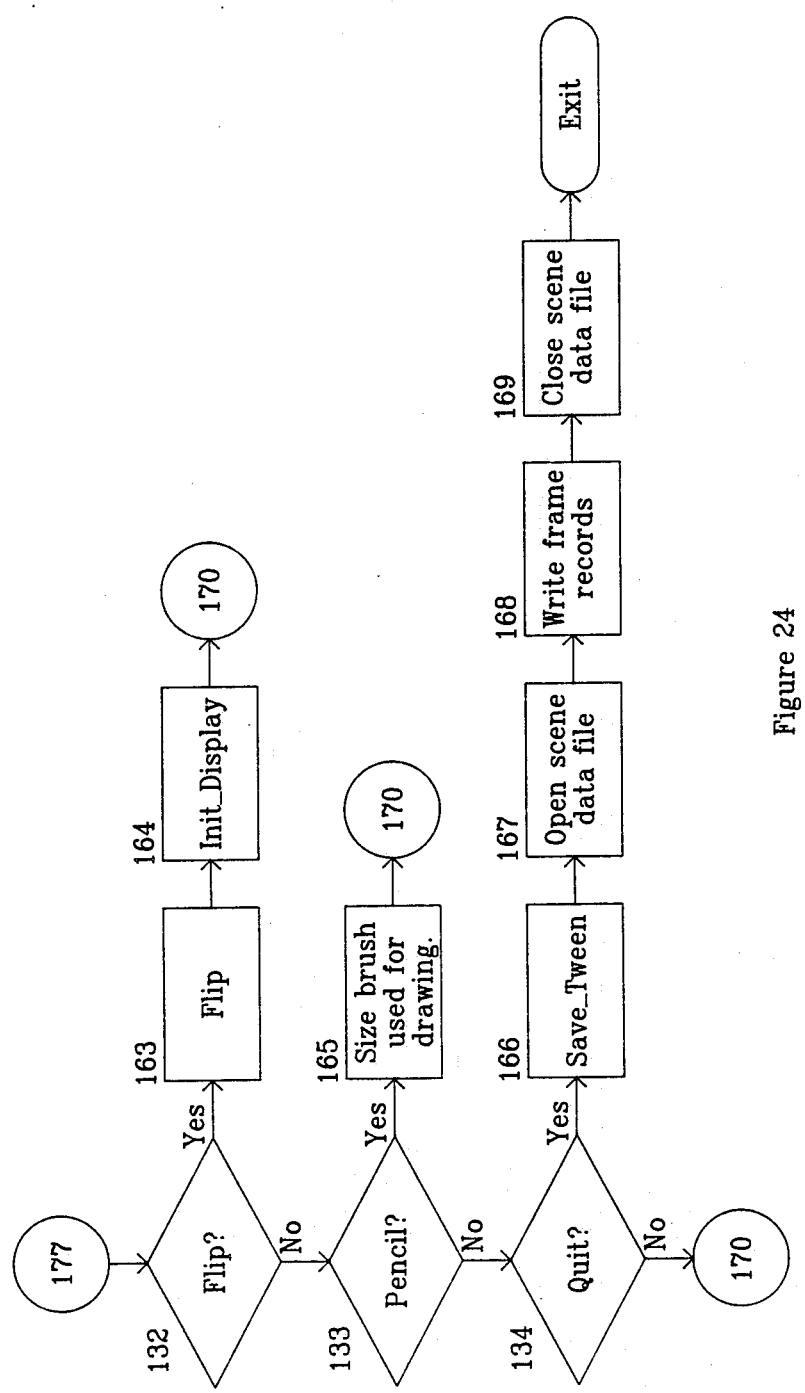
FIG. 24: Shows the last section of a flow chart of the command logic.

FIGS. 22, 23, and 24 show successive portions of a flow chart outlining the control logic used to implement this method.

Referring first to FIG. 22, when the control logic first begins to execute on CPU 53, it invokes the LOAD_SCENE operation at 123 to begin a new scene or read an existing scene.

At 124 the program invokes the INIT_DISPLAY operation to show the first tweens in the display. (This may be only a single tween on which no drawing has yet been done.)

Having initialized display 51, the program waits at 125 for an event or action on the part of the animator. The animator may cause a great number of different operations to take place. Those operations essential to the novel features the process claimed by us are described in the following paragraphs.

When a command is given, the program matches that command with each possible command at decision points 126 through 134. When a match is found, the steps outlined for that command (as explained below) are carried out by the program. Until the quit command is recieved at 134, the program loops back at 170 (after executing each command) to 125, where it awaits a new command.

Draw 126—When stylus tip switch 87 is engaged by pressing with stylus 57 against graphics tablet 56, the software sets to one all pixels in current layer 82 located within the shape of the brush at the location indicated by pointer 58 on display 51.

Erase 81—When stylus barrel switch 88 is engaged, by pressing with a finger, the software sets to zero all pixels in current layer 82 located within the shape of the brush at the location indicated by pointer 58 on display 51.

The flow chart connects at 176 to its continuation in FIG. 23.

Add Following 128—The animator invokes Add Following by pressing the up arrow key on keyboard 55 or by pressing tip switch 87 while pointer 58 is located over Add Following command box 137. This adds a frame to the scene after current frame 66 and prepares a blank tween to be drawn.

At 138 the program saves current tween 73 from current layer 82 to permanent storage 50 using the SAVE_TWEEN operation. At 139 the software invokes the COPY(TWEEN, PREC) operation so that current tween 73 is displayed as new preceding tween 74. The software invokes the NEXT operation so following frame 68 becomes new current frame 66. We invoke the INSERT operation at 141 to create a new current frame 66. There is no need to invoke LOAD(FOLL) because following tween 75 does not change position. To clear current layer 82 for drawing new current tween 73, the software invokes the CLEAR(TWEEN) operation at 142.

Add Preceding 129—The animator invokes Add Preceding by pressing the down arrow key on keyboard 55 or by pressing tip switch 87 while pointer 58 is located over Add Preceding command box 143. This adds a frame to the scene before current frame 66 and prepares a new current tween 73 for drawing.

At 144 the program saves current tween 73 from current layer 82 to permanent storage 50 using the SAVE_TWEEN operation. At 145 the software invokes the COPY(TWEEN, FOLL) operation so that current tween 73 is displayed as new following tween 75. We invoke the INSERT operation at 146 to create a new current frame 66. There is no need to invoke LOAD(PREC) because preceding tween 74 does not change position. To clear current layer 82 for drawing new current tween 73, the software invokes the CLEAR(TWEEN) operation at 147.

Preceding 130—The animator invokes Preceding by pressing the left arrow key on keyboard 55 or by pressing tip switch 87 while pointer 58 is located over Preceding command box 148.

At 149 the program saves current tween 73 from current layer 82 to permanent storage 50 using the SAVE_TWEEN operation. It then makes preceding frame 67 the new current frame 66 using the PREV operation at 150. If, at 151, the PREV operation indicates EOL, then no further action occurs.

If at 151 the PREV operation has successfully stepped back one frame, we copy current layer 82 to following layer 83 using the COPY(TWEEN, FOLL) operation at 152. At 153 we copy preceding layer 81 to current layer 82 using the COPY(PREC, TWEEN) operation. Finally at 154, the software loads the tween image for new preceding frame 67 using the LOAD(PREC) command.

Following 131—The animator invokes Following by pressing the right arrow key on keyboard 55 or by pressing tip switch 87 while pointer 58 is located over Following command box 155.

At 149 the program saves current tween 73 from current layer 82 to permanent storage 50 using the SAVE_TWEEN operation. It then makes following frame 68 the new current frame 66 using the NEXT operation at 157. If, at 158, the NEXT operation indicates EOL, then no further action occurs.

If at 158 the NEXT operation has successfully stepped forward one frame, we copy current layer 82 to preceding layer 81 using the COPY(TWEEN, PREC) operation at 159. At 160 we copy following layer 83 to current layer 82 using the COPY(FOLL, TWEEN) operation. Finally at 161, the software loads the tween image for new following frame 68 using the LOAD(-FOLL) command.

The flow chart connects at 177 to its continuation in FIG. 24.

Flip 132—By pressing the 'F' key on keyboard 55 or pressing tip switch 87 while pointer 58 is over Flip command box 162 an immediate, true speed pencil test of the animation drawings is presented.

At 163, the software displays all ready frames (tween images currently in RAM 54) in sequence one after the other using the FLIP operation (described above). At 164, after the ready frames have been viewed, the software restores the display to the state it was in before the Flip command by invoking INIT_DISPLAY.

Pencil 133—Pressing keys '1' through '9' on keyboard 55, commands the software to size the brush. At 165, Pencil makes the brush shape large or small according to the key selected. This is the brush shape to which draw and erase commands 126 and 127 conform in setting pixels in tween layer 65 to one or to zero.

Quit 134—Pressing the 'Q' key on keyboard 55 commands the software exit. At 166 the program saves current tween 73 from current layer 82 to permanent storage 50 using the SAVE_TWEEN operation. At 167 we OPEN the scene file, WRITE the frame records at 168, then CLOSE the scene file at 169, and cease to execute any further on CPU 53.

A SCENARIO

Figure 25:
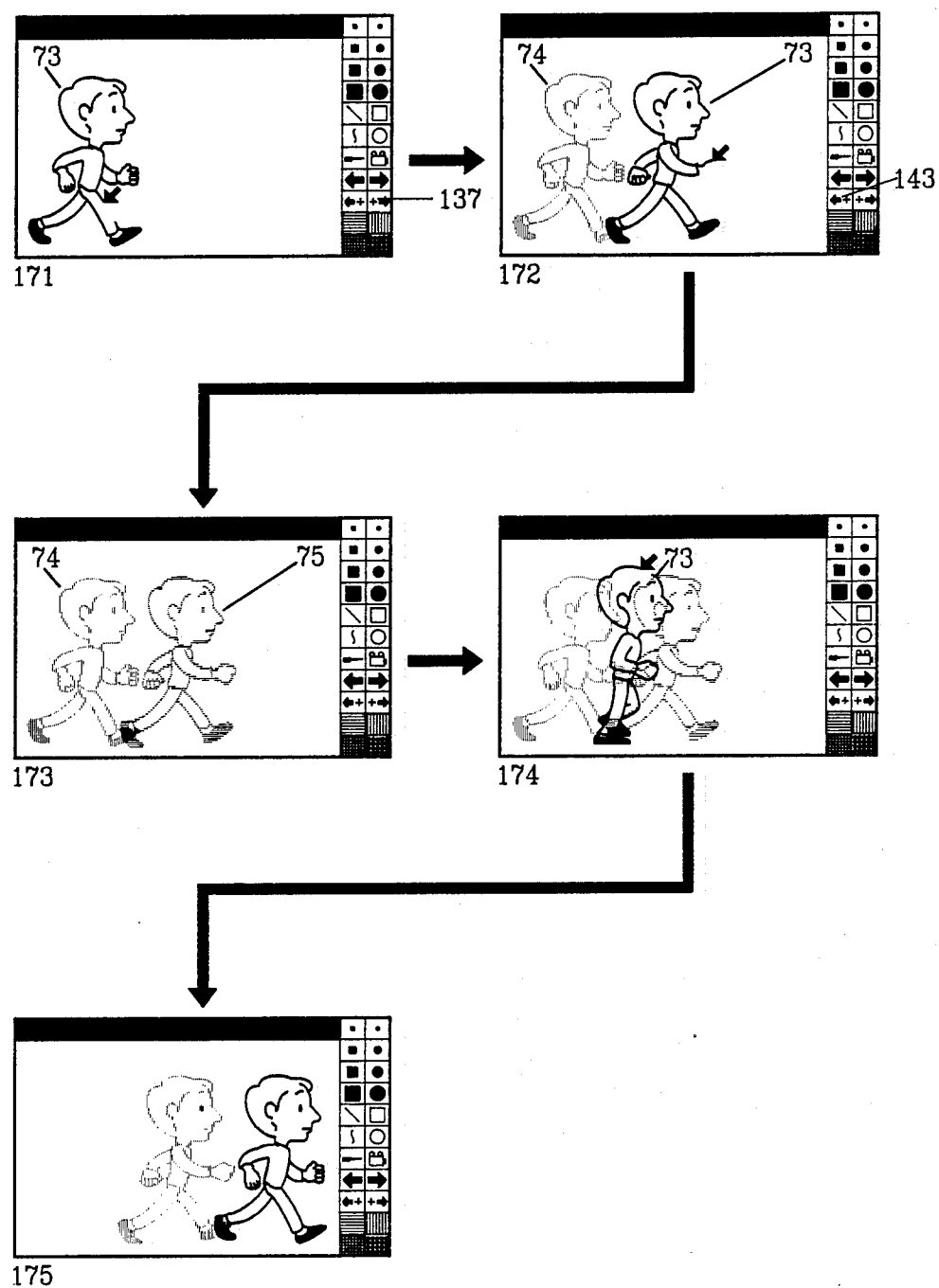
FIG. 25: Shows a series of frames which illustrate the present invention as it might be used by an animator.

We will now describe, with reference to FIG. 25, a typical scenario for creating an animation with our method.

Start the program with the name given for this particular scene, for example, "Walk." The computer presents a blank display so that the first tween may be drawn.

In the first frame, the animator draws the first extreme position of the figure walking. She does this by moving stylus 57 over the surface of tablet 56 to position pointer 58 for drawing.

To make a "mark" on the display she presses stylus 57 against tablet 56, engaging tip switch 87. She draws one leg (the left) extending back and the other (the right) extending forward. This drawing for current tween 73 is represented in black as shown in image 171.

The animator draws a second extreme in which the left foot is extending forward. To do this she first adds a frame to the scene by moving pointer 58 over Add Following command box 137 and engaging tip switch 87. The Add Following command saves the first drawing to permanent storage 50, copies it to preceding layer 81 where it is displayed in pink as preceding tween 74, and creates a new, blank frame following the one just drawn. This new frame is new current tween 73.

As shown in image 172, the second extreme is drawn by the same method as the first. The drawing differs in that the left leg extends forward and the right leg extends back. The arms are drawn in new positions as well. Drawing and erasing is done on current tween 73 only, which drawing is displayed in black.

To transform these two still pictures into a series of images which give the illusion of the figure taking a step, the animator will now add in-betweens. She creates the first in-between by selecting Add Preceding command box 143. Add Preceding saves the current drawing to permanent storage 50, copies it to following layer 83 where it is displayed in light green, and creates a new, blank frame preceding the one just drawn.

As seen in figure 173, pink and green images corresponding to the first and second drawings are now visible. The new current tween is blank. It comes after preceding tween 74 in pink and before following tween 75 in green. The new current tween 73 is drawn in black as an in-between, with reference to the drawing that comes before, seen in pink, and the one that follows, seen in green. Image 174 shows the result.

Further extremes and in-betweens may be drawn using the Following, Add Following, Preceding, and Add Preceding commands. Drawings are saved to permanent storage 50 automatically, and preceding and following frames in pink and green are provided for reference. Image 175 shows the next extreme drawn to continue the walk for another step.

When a few drawings have been made, the animation may be viewed by selecting Flip. If the animation is not acceptable, drawings can be altered and the animation viewed again using the flip command.

When the animation is completed, each drawing may be colored, using a conventional computer based paint system, then recorded one frame at a time onto videotape or film.

CONCLUSION

The reader will thus see that our method combines the usual phases of pencil testing and the drawing of in-betweens into a single specialized drawing tool for animators.

Our method keeps the animation drawings in sequence and assists in the process of in-betweening by eliminating the need to shuffle, label, and re-order the drawings.

Once a number of drawings have been completed an instant pencil test can be viewed. A view of the motion as it will appear in the finished piece is shown immediately, at the same time as the drawings are being drawn. The creative act and the creation itself are no longer separated by the delay in transferring the still drawings to a motion medium. Instant feedback gives the animator more freedom to experiment and to make revisions and refinements.

Because the drawings are digital, they are always clean, can be colored directly without inking onto cels or consideration for layered depths of cels, and can be exposed to traditional media for distribution by an automatic, rather than manual method.

We have combined the advantages of 2-D computer graphics techniques with classical animation techniques, yielding an innovative method which speeds the production of animation many times over and which gives increased creative control to the animator.

RAMIFICATIONS

While the above description contains many specificities, these should not be construed as limitations on the scope of the invention, but rather as an exemplification of one preferred embodiment thereof. Many other variations are possible.

For example, a great deal of performance in storing and retrieving frame, scene, and drawing data might be gained by addressing the storage space directly, rather than using a file system. We have chosen to use a file system so that the data may be available to others in a standardized format for use in other processes. Sophisticated drawing tools in the class of paint programs, for example, might be available for creating the background and foreground images.

Hardware may become available which will allow mass storage to be accessed as rapidly as we currently access memory. Optical disks are capable of this when retrieving data, for example, but are unsuitable for this application as information on them can be written once but never altered. A continuous data transfer rate of two to three megabytes per second is needed from a read/write medium.

Such a development will eliminate the need to use memory as a temporary, fast-access storage medium. This would be very useful, too, because it would mean that an arbitrary portion of the scene, up to and including the entire work, could be replayed upon command, altered, and immediately replayed in its altered form. Our invention does this within the limits of the technology currently available.

A second innovation which some will be tempted to make is to save a bit-map encompassing only the portion of the tween drawing which is different from each tween to the next, that is, only those parts that have been redrawn. This is similar to the strategy used in "cell" or sprite animation on computers, and has the advantage of limiting the amount of data which has to be moved to the display from one tween to the next.

The image data may certainly be compressed by some means. We have used run-length encoding, which effectively eliminates the undrawn portions of the tween from the data. Other compression or encoding schemes might be applied. To prevent the repetitive storage of static image information, portions of the image which remain unchanged through a long series of frames may be placed in the background or foreground and eliminated from the tweens.

It is not necessary to save the current tween to disk when moving to next or previous frames if the current tween has not been altered with draw or erase.

The extremes might be shown in the display in lightened grays, transparent colors, or half-tones as if they are beneath sheets of paper. The in-between might even be drawn in color with reference to lightened, colored extremes. In practice, we have found that pencil drawings are usually used for in-betweening, though; and coloring is done later.

Sequences of animation might be stored and catalogued, then retrieved for re-use in a different animated sequence. These could be placed in any position in the frame, rotated, or reversed.

All of the techniques of two dimensional computer graphics might be applied to providing more extensive drawing tools. It is very useful, for instance, to be able to cut away a portion of the image or copy a portion of the image to the brush. This cut-out portion can then be duplicated in any position on the current tween drawing or on any following or preceding tween drawings, backgrounds, or foregrounds.

Cutout brushes could be manipulated with various geometric transformations, such as rotation, scaling, and reversal.

When a cartoon character is designed, model drawings with different views, and representing the proportions and general appearance of the character are often prepared. It is useful to be able to refer to these while making actual animated drawings of that character.

For this purpose a display might be provided which is independent of the scene and of the tweens display. Drawings may be created on, loaded to, altered in, and/or saved from the model sheet without affecting any of the elements of the scene, including the tweens.

The animator could shift from Tween mode to Model mode, and back to Tween mode at will. The display will change from that of the tweens, to that of the model sheet, and back to the tweens.

It is useful to be able to draw on the model sheet using all of the same methods as are available when drawing the tweens. Further, it is useful to be able to create a cutout from either display and carry it to the other. In this way, a pose may be cut from the model sheet, optionally scaled or rotated, and after a switch to Tween mode, pasted into one or more tweens from the scene.

Model drawings would be kept in a separate display. They are not part of the animation sequence; therefore, they are not kept in the list of frames. The user can switch between the Tween display and Model mode. Cut-outs made in Tween mode can be used in Model mode and vice-versa. All drawing tools are also available in Model mode.

Path-line drawings may be superimposed on the tweens. The path drawing does not change as the tweens are advanced or flipped. The same one remains displayed to be used as reference for groups of drawings. They will not become a part of the finished drawing. They can be drawn and erased at will or a drawing can be called up from disk storage.

Two methods may be provided for the animator to separate static elements in a scene from those that are moving. These eliminate a great deal of redrawing.

First, backgrounds and foregrounds may be drawn separately, which contain all static elements for the scene. The backgrounds and foregrounds may extend beyond the boundaries of the display and a facility provided for scrolling them in any direction, by some described amount, at every frame.

Second, any part of a tween may be cut away and copied in place to one or more preceding or succeeding tweens.

Animators are familiar with an exposure sheet, which may give explicit written instructions, frame by frame, for camera movement, sound synchronization, and the timing of each drawing.

This is the type of information which may be kept in the record of a frame along with the tween drawing.

A facility may be provided for viewing and editing this information in text form, and for making printed records, much as is done in the familiar spreadsheet and filing systems widely used on computers.

Further, a facility can be provided for viewing and editing this information in text form for the current frame while in the Tween mode. The textual information may be presented for editing by any effective method. Our preferred method is to superimpose a view which completely occludes a portion of the display, and which organizes the elements in individually editable fields within the view.

It follows that all of the editing capabilities normally associated with editing film or videotape are applicable to the scene. Facility may be provided for cutting, copying, importing, exporting, and inserting whole sequences of frames. Whole sequences might be superimposed on the existing tweens, too. This would enable character motions stored in libraries to be retrieved and pasted into the scene along with other stock animation and that which is newly drawn.

The ability to delete an arbitrary frame or series of frames might be considered fundamental. Whole sequences of frames could be cut and pasted at will.

The scene list may be optionally saved to disk upon command when frames have been added or deleted. Also, sections of the scene list local to the current frame could be maintained in RAM while other sections remain on disk. Another option would be to the virtual memory capability of an operating system. These options must be considered if the scene list becomes larger than what will fit in RAM.

It is a simple matter to include the ability to toggle the view of independent layers so that they may be seen in any combination. It is sometimes useful to be able to turn off the display of extremes while working on details of the current tween.

More than one cel level could be implemented, one of which is active, editable, or current at any given time. The animator would switch between them to draw different moving figures or parts of the action in the same frame.

Some in-betweens could be "turned off" so as to bring together two drawings in the display which would otherwise be separated by one or more tweens.

It is convenient to be able to skip to an arbitrary frame in the scene. The frames may be measured in units of the time each will be displayed upon replay. The frame occuring nearest one minute, twenty and one half seconds, for example. Alternatively, a proportional sliding scale can be used from which a time may be derived from the total time of the scene (half way, one third way etc.). The frame specified will become the current frame and the display will be set up by loading the preceding, current, and following tweens, background, foreground etc., from memory or from the disk as required.

A duration associated with each frame obviates any need to have many duplicates of the same frame when some object temporarily comes to rest. A default duration in units such as thirtieths of a second (or "jiffies," used in video, where thirty frames are displayed in one second) could be preset for each new image added to the scene.

When in-betweens are added, each in-between might be assigned a duration equal to half the duration of the frame which comes before it, and the duration of the preceding frame reduced by the same amount. This makes it possible to plan the timing of the animation using relatively few drawings, then in-between without disturbing the timing.

When one tween is to be inserted between every drawing already in the scene, it may be desirable to create, with a single command, the next in-between to be inserted. Drawings already in the scene are skipped over and used as reference drawings. This would be accomplished by inserting an in-between immediately after the drawing currently displayed as the following drawing. In other words, the following drawing is moved into position as the preceding drawing, and a blank frame is presented for the drawing of the new in-between.

As an expansion of our implementation, multiple foreground and background planes might be supported, each with separate scroll rates. This would enable the effects of a multiplane camera to be achieved.

Foreground(s) and background(s) might be larger than the display and be scrolled from one frame to the next. Scroll increments can be preset and the background position updated automatically with each succeeding frame. Scroll rates could be arranged to give the effect of near and far objects passing before the viewer.

It would be possible to have the animator wait while ready frames in the immediate vicinity of the newly located current frame are loaded to memory. We prefer to let him make ready only the frames that he desires to include in the flip by moving forward and backward over the desired range.

It would be possible, too, to have a monitor which worked independently and automatically to make ready frames before and after the current frame concurrently, while the animator is drawing, not waiting for the animator to actually call for the frames by moving forward or backward. In practice, the manual method we have used has not introduced any undue inconvenience to the animator.

It is sometimes desirable, however, to reduce the range of frames shown by the flip. The animator can designate the current frame as the starting/ending frame of the flip. Regardless of what is ready in memory, the flip will not include frames before/after that frame. The designated starting/ending position is pushed back/forward with the current frame if the current frame becomes earlier/later. If the start of the flip is designated, for instance, and then the animator moves to a frame before that designated frame, then the designated start of the flip will be shifted back accordingly to the current frame. This prevents the current frame from being outside of the range marked for the flip.

Image processing techniques might be applied to any of the image planes. One application might be to blur planes to give them the effect of being out of the focal plane of a camera, giving a more realistic three dimensional effect. Planes closer to and further away from the focal plane would be given more blur.

Multiple animated planes might be used, as well as just one. These could have different levels of transparency or opacity so that shadows, for instance, could be animated by drawing shapes that selectively darken, but do not eclipse the animated figure underneath.

Drawings may have many shades and interfaces used which give the look and feel of an actual pencil, or other favored drawing tool of the animator.

Animation may be superimposed against still or moving live backgrounds using the analogue video technique of gen-locking, or they may be mixed with other imagery inside a computer using digital matting techniques.

For rotoscoping, still frames from the model motion might be gen-locked to the display for tracing or digitized and used directly. Digital video technology might obviate the need to digitize an analog video or film image.

Methods might be added for generating in-betweens, expanding or contracting the length of an animated segment, blurring motion and the like. Any number of video and film effects might be supported by the implementation or added later using other computer applications, film, or equipment.

We have not chosen to represent the background, foreground, or tween layers in full color for tween drawing, although it would certainly be possible with special equipment.

This does not imply that the drawings, stored on the disk may not have color information associated with them.

A separate facility might be provided for the drawing and coloring of backgrounds and foregrounds and for the coloring of tweens.

The frame may have any type of information associated. For instance, coding of music and other sound events could be included where the timing of the music codes advances in synchronization with the timing of the frames. Further, as this information is associated with the frame, it could be displayed and edited in the exposure sheet.

In the finishing stage, the colored background is brought to the display, the colored tween is merged on top, then the colored foreground is merged on top of the result. The resulting image represents that frame in full color, and may be saved as an individual file, or otherwise transferred to another medium, such as a frame or frames of film or videotape. A method for automating this can be provided which operates by reading the scene information and remotely controlling the device handling the medium to which the transfer is to be made.

It is possible to flip full color, finished frames at full speed as well.

Many machines might be connected to a common storage medium so that scene and image data could be shared and manipulated by a number of animators working simultaneously.

We have not implemented all of these enhanced features. There may be other processes which may be usefully applied to the scene list. We intend to explore further innovations which may enhance or add capability to the essential process here claimed.

SCOPE

Accordingly, the scope of the invention should be determined not by the embodiments illustrated, but by the appended claims and their legal equivalents.

We claim:

1. A system for making animated films comprising:
   a. a list maintaining a sequential ordering of drawings on a storage device,
   b. means for interposing additional drawings or removing existing drawings at any selected position in said list,
   c. a display showing three or more drawings from said list together, in registration,
   d. means for creating and editing any one of the drawings on said display, and
   e. means for causing drawings from said list to be shown one after another on said display at a speed which gives the effect of animation,
   whereby the means for drawing and the means for experiencing the resulting animation are fully integrated.

2. The system of claim 1, further including means for interposing reference markings with said drawings in said display.

3. The system of claim 1, further including means to display said drawings at a calibrated speed.

4. The system of claim 1, further including means for transferring said contiguous drawings to a recording device.

5. The system of claim 1, further including means for moving forward and backward through the list to examine or edit individual drawings.

6. The system of claim 5, wherein preceding, following, and current drawings from said list, if present, are maintained on said display as the animator moves forward and backward through the list.

7. A method for making animated films comprising the steps of:
   a. providing an ordered list of digitally rendered drawings,
   b. displaying a combination of two or more of said digital drawings from said ordered list so that the drawings are superposed but distinguishable from each other,
   c. creating a new drawing or altering a current drawing in said combination such that said new or current drawing is distinguishable from other drawings in said combination,
   d. optionally displaying said drawings from said ordered list, including the new or current drawing, one after another at a speed which gives the effect of animation, and
   e. saving said new or altered drawing separately, but in sequence in the ordered list,
   whereby drawing and viewing the resulting animation may both be carried out during the act of creation, allowing the artist to check his or her work and make subtle changes while drawing.

8. The method of claim 7, further including interposing reference markings with said drawings.

9. The method of claim 7, wherein said drawings are sequentially displayed at a calibrated speed.

10. The method of claim 7, wherein said drawings are sequentially transferred to a recording device.

* * * * *